United States Patent
Chien et al.

(10) Patent No.: US 10,031,643 B2
(45) Date of Patent: Jul. 24, 2018

(54) PREDICTIVE DETERMINATION OF ACTIONS

(71) Applicants: AT&T Intellectual Property I, L.P., Atlanta, GA (US); AT&T Mobility II LLC, Atlanta, GA (US)

(72) Inventors: Ginger Chien, Bellevue, WA (US); Yehoshuva Arasavelli, Redmond, WA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 898 days.

(21) Appl. No.: 14/497,431

(22) Filed: Sep. 26, 2014

(65) Prior Publication Data

US 2016/0092039 A1    Mar. 31, 2016

(51) Int. Cl.
| | |
|---|---|
| *G06F 3/023* | (2006.01) |
| *G06F 3/0482* | (2013.01) |
| *H04L 12/58* | (2006.01) |
| *G06F 3/0488* | (2013.01) |

(52) U.S. Cl.
CPC .......... *G06F 3/0482* (2013.01); *G06F 3/0237* (2013.01); *G06F 3/04886* (2013.01); *H04L 51/38* (2013.01)

(58) Field of Classification Search
CPC .... G06F 3/017; G06F 3/0237; G06F 3/04817; G06F 3/04842; G06F 3/0482; G06F 3/04886; G06F 17/276; G06F 3/04883; G06F 8/42; G06F 8/43
See application file for complete search history.

(56) References Cited

U.S. PATENT DOCUMENTS

| | | |
|---|---|---|
| 3,668,654 A | 6/1972 | Doersam, Jr. |
| 5,255,386 A | 10/1993 | Prager |
| 5,896,321 A | 4/1999 | Miller et al. |
| 6,377,965 B1 | 4/2002 | Hachamovitch et al. |
| 6,622,119 B1 | 9/2003 | Ramaswamy et al. |
| 6,651,241 B1 | 11/2003 | Hernandez, III |
| 6,724,408 B1 | 4/2004 | Chen et al. |
| 6,760,717 B2 | 7/2004 | Suda et al. |

(Continued)

FOREIGN PATENT DOCUMENTS

| | | |
|---|---|---|
| JP | H0219928 | 1/1990 |
| JP | H1027089 | 1/1998 |

(Continued)

OTHER PUBLICATIONS

Hyvonen et al., "Semantic Autocompletion," The Semantic Web-ASWC 2006, 2006, Springer Berlin Heidelberg.

(Continued)

*Primary Examiner* — Rinna Yi
(74) *Attorney, Agent, or Firm* — Hartman & Citrin LLC

(57) ABSTRACT

Concepts and technologies are disclosed herein for predictive determination of actions. According to one aspect of the concepts and technologies disclosed herein, a user device can receive input via a user input interface. The user input interface is application agnostic. The user device can analyze the input to determine an action option. The action option can include an action to be performed by the user device if selected. The user device also can present the action option for selection.

19 Claims, 22 Drawing Sheets

(56) References Cited

U.S. PATENT DOCUMENTS

| | | |
|---|---|---|
| 7,043,476 B2 | 5/2006 | Robson |
| 7,047,498 B2 | 5/2006 | Lui et al. |
| RE39,326 E | 10/2006 | Comer et al. |
| 7,181,497 B1 | 2/2007 | Appelman et al. |
| 7,225,244 B2 | 5/2007 | Reynolds et al. |
| 7,574,661 B2 | 8/2009 | Matsuura et al. |
| 7,624,340 B2 | 11/2009 | Ritter |
| 7,936,356 B2 | 5/2011 | Furuichi et al. |
| 8,234,293 B2 | 7/2012 | Martynov et al. |
| 8,694,886 B2 | 4/2014 | Acedo et al. |
| 2008/0155565 A1 | 6/2008 | Poduri |
| 2009/0174668 A1* | 7/2009 | Cho ............... G06F 3/0482 345/169 |
| 2009/0248902 A1 | 10/2009 | Blue |
| 2009/0274286 A1* | 11/2009 | O'Shaughnessy ................ H04M 1/72547 379/201.12 |
| 2012/0011426 A1* | 1/2012 | Yach ............... G06F 17/2705 715/208 |
| 2013/0191790 A1 | 7/2013 | Kawalkar |
| 2013/0263043 A1 | 10/2013 | Sarbin |
| 2014/0101611 A1 | 4/2014 | Lang et al. |

FOREIGN PATENT DOCUMENTS

| | | |
|---|---|---|
| JP | 2002351600 | 12/2002 |
| KR | 20120135396 | 12/2012 |
| WO | WO 2006058103 | 6/2006 |
| WO | WO 2012105792 | 8/2012 |

OTHER PUBLICATIONS

Li et al., "Efficient Type-Ahead Search on Relational Data: a TASTIER Approach," Proceedings of the 2009 ACM SIGMOD International Conference on Management of Data, Jun. 29-Jul. 2, 2009, ACM.

Yan et al., "Fast App Launching for Mobile Devices Using Predictive User Context," Proceedings of the $10^{th}$ International Conference on Mobile Systems, Applications, and Services, Jun. 25-29, 2012, ACM.

Li et al., "Efficient fuzzy fill-type text type-ahead search," The VLDB Journal, 20.4, 2011, pp. 617-640.

Pejovic et al., "Anticipatory Mobile Computing: A Survey of the State of the Art and Research Challenges," ACM Computing Surveys, vol. V, No. N, Article A, 2013, ACM.

Wang et al., "Automatic URL Completion and Prediction Using Fuzzy Type-Ahead Search," Proceedings of the $32^{nd}$ International ACM SIGIR Conference on Research and Development in Information Retrieval, Jul. 19-23, 2009, ACM.

Basu Roy et al., "Location-Aware Type Ahead Search on Spatial Databases: Semantics and Efficiency," Proceedings of the 2011 ACM SIGMOD International Conference on Management of Data, Jun. 12-16, 2011, ACM.

\* cited by examiner

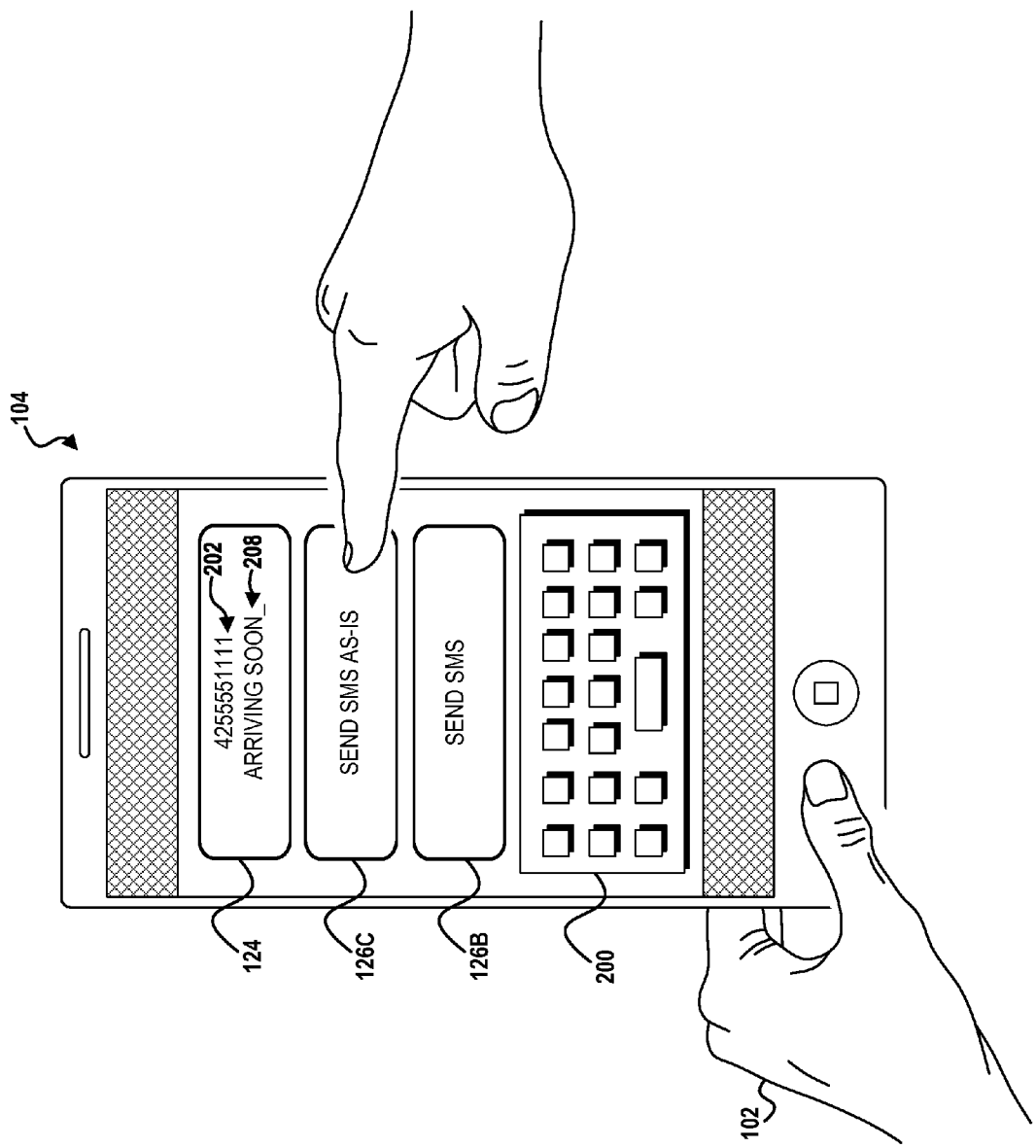

PREDICTIVE DETERMINATION OF ACTIONS

BACKGROUND

Today, some software applications provide quick response interfaces that provide software functions built around immediate and obvious context. For example, if a user is viewing a home screen on their device and a short message service ("SMS") message arrives, the SMS message might appear in a popup with a text entry field through which the user can provide a quick response or can select a "close" box to dismiss and ignore the SMS message. However, there is an obvious proximate event and application in this scenario (i.e., the arrival of a message in an SMS application), a known address to reply to, and two high likelihood actions that are elevated to the user interface—more specifically, to respond or to dismiss the SMS message, with other options such as file-in-a-folder or delete not rising to the level of a common action deserving user interface attention. The SMS application relies on the context of an incoming SMS message to be aware that text entered by the user is relevant to the received SMS message. Without such context, the SMS application is unable to know that text entered by the user relates to the SMS application or whether the text might be relevant to a completely different application.

Contextual interpretation of increasing amounts of data has been used in other settings to guide increasingly accurate decisions in a search function. For example, some operating systems, such as APPLE OS X, have a global search function in which a user begins typing a string of characters and an instantaneous list of candidates narrows down to a set of selectable locally or cloud-stored documents, emails, media files, and the like with filenames or content that contain the characters. GOOGLE provides a similar search function in which a user begins typing a search string and an instantaneous list of suggestions narrows down from which the user can select an expanded string to avoid further typing. However, both of these solutions already assume an action. In APPLE OS X, the search primarily seeks to "open" a file that has attributes closely matching the search string. The search function provided by GOOGLE primarily seeks to search the World Wide Web using a string.

Contextual interpretation that refines the choice of messaging applications also exists today. A generic messaging application might accept multiple destination addresses and/or attachments. Upon receiving multiple addresses or attachments that preclude use of SMS and require use of multimedia message service ("MMS"), the messaging client might make a determination that MMS should be used, and might notify the user that such a decision is being made in order to satisfy the implicit request and approval embodied in the provided content.

SUMMARY

Concepts and technologies are disclosed herein for predictive determination of actions. According to one aspect of the concepts and technologies disclosed herein, a user device can receive input via a user input interface. The user input interface is application agnostic. The user device can analyze the input to determine an action option. The action option can include an action to be performed by the user device if selected. The user device also can present the action option for selection.

In some embodiments, the user device can launch the user input interface in response to a user trigger. The user trigger can be one or more button presses. The user trigger can include single or multiple button presses of the same or different hardware and/or software buttons (e.g., one or more buttons of a software keyboard) in any sequence or combination. The user trigger can be a gesture, such as a user shaking the user device as detected via one or more sensors (e.g., a gyroscope and/or accelerometer). The user trigger can be a sound generated by a user (e.g., the user speaking a word or phrase, or the user singing, humming or otherwise making sound) or an environmental sound (e.g., music playing in the background). The user trigger can be a combination of any of the aforementioned triggers. Other user triggers are contemplated.

In some embodiments, the user device can receive a selection of the action option. The user device, in these embodiments, can perform the action in response to receiving the selection of the action option.

In some embodiments, the user device can receive further input via the user input interface. The user device, in the embodiments, can analyze the further input to determine a further action option. The further action option can include a further action to be performed by the user device if selected.

In some embodiments, the user device can receive further input via the user input interface. The user device, in these embodiments, can analyze the further input to modify the action option. In some embodiments, the input can include numbers and the further input can include text. The action option can include a send short messaging service ("SMS") message option that, when selected, causes the user device to generate a SMS message directed to a telephone number defined by the numbers and having a message body that contains the text, and causes the user device to open a SMS application through which the message body can be modified prior to the short messaging service message being sent. The further action option can include a send SMS option as-is that, when selected, causes the user device to generate a SMS message directed to a telephone number defined by the numbers and having a message body that contains the text and the user device sending the SMS.

In some embodiments, the input includes numbers. The action option, in these embodiments, can include a call action option, a send SMS message option, or a call action option and a send SMS message option. It should be understood that the context and typical usage patterns for a numeric string can be unique to each user and/or can be unique to each application. A global recognition function can rate a likelihood as a phone number or as a ZIP code, for example. Alternatively, each application can be given the numeric string and each application can independently assess the relevancy of the numeric string. These different implementation options and several variations are described in greater detail herein.

In some embodiments, the user device can identify data associated with the input. The user device, in these embodiments, can weight the data against a set of possible data types of interest to a plurality of applications. The user device can receive, from at least one application of the plurality of applications, a value indicative of a likelihood that the data is useable as input by the application(s). In these embodiments, the user device can present the action option associated with an application of the plurality of applications having the value indicative of a highest likelihood that the data is useable as input. In some embodiments, the user device can prioritize multiple applications based upon corresponding likelihoods, and the action option can include a plurality of action options arranged based upon such prioritization.

In some embodiments, the user device can receive a plurality of weights from a plurality of applications. Each weight of the plurality of weights can be associated with a likelihood that a corresponding one of the plurality of applications can utilize data associated with the input. The user device can determine which weight of the plurality of weights has a highest likelihood. The action option can include the action to be performed by an application of the plurality of applications associated with the weight of the plurality of weights that has the highest likelihood. In some embodiments, the user device can prioritize multiple applications based upon corresponding likelihoods, and the action option can include a plurality of action options arranged based upon such prioritization.

In some embodiments, the user device presents the user input interface on a display. The user input interface may be presented in other forms, including, but not limited to, voice input, gesture input, touch input, or the like.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2A-2G are user interface diagrams illustrating aspects of a user input interface, according to illustrative embodiments.

DETAILED DESCRIPTION

Figure 1:
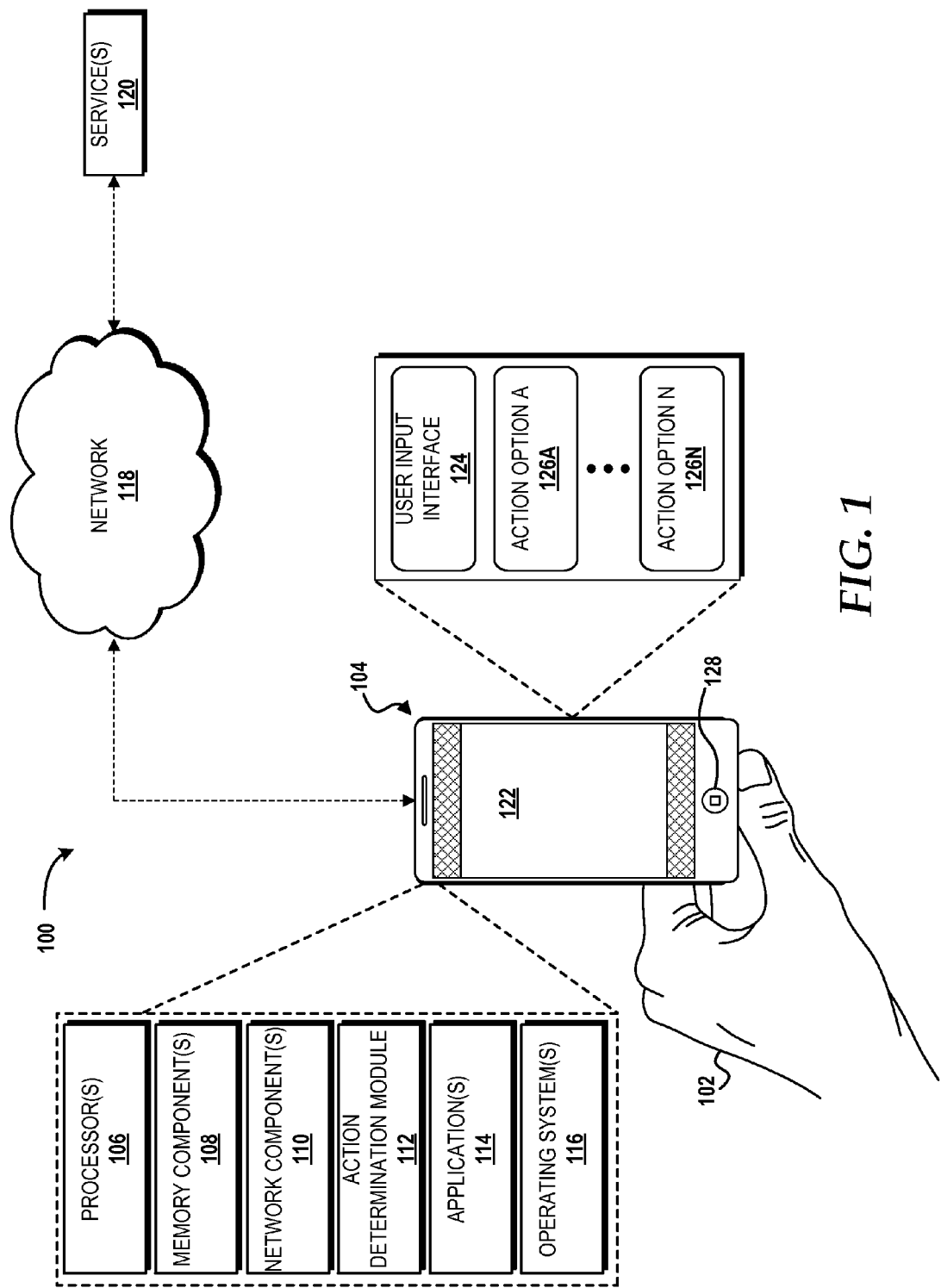
FIG. 1 is a diagram illustrating aspects of an illustrative operating environment for various concepts disclosed herein, according to an illustrative embodiment.

Today, some software applications provide quick response interfaces that provide software functions built around immediate and obvious context. For example, if a user is viewing a home screen on their device and a short message service ("SMS") message arrives, the SMS message might appear in a popup with a text entry field through which the user can provide a quick response or can select a "close" box to dismiss and ignore the SMS message. However, there is an obvious proximate event and application in this scenario (i.e., the arrival of a message in an SMS application), a known address to reply to, and two high likelihood actions that are elevated to the user interface—more specifically, to respond or to dismiss the SMS message, with other options such as file-in-a-folder or delete not rising to the level of a common action deserving user interface attention. The SMS application relies on the context of an incoming SMS message to be aware that text entered by the user is relevant to the received SMS message. Without such context, the SMS application is unable to know that text entered by the user relates to the SMS application or whether the text might be relevant to a completely different application.

Contextual interpretation of increasing amounts of data has been used in other settings to guide increasingly accurate decisions in a search function. For example, some operating systems, such as APPLE OS X, have a global search function in which a user begins typing a string of characters and an instantaneous list of possible matches narrows down to a set of selectable locally or cloud-stored documents, emails, media files, and the like with filenames or content that contain the characters. GOOGLE provides a similar search function in which a user begins typing a search string and an instantaneous list of search suggestions narrows down and from which the user can select an expanded string to avoid further typing. However, both of these solutions already assume an action. In APPLE OS X, the search primarily seeks to "open" a file that has attributes closely matching the search string. The search function provided by GOOGLE primarily seeks to search the World Wide Web using a string.

Contextual interpretation that refines the choice of messaging applications also exists today. A generic messaging application might accept multiple destination addresses and/or attachments. Upon receiving multiple addresses or attachments that preclude use of SMS and require use of multimedia message service ("MMS"), the messaging client might make a determination that MMS should be used, and might notify the user that such a decision is being made in order to satisfy the implicit request and approval embodied in the provided content.

The concepts and technologies disclosed herein for predictive determination of actions do not require, as do the aforementioned technologies, the initial selection of a messaging application and allows for analysis of mixed types of literal and non-literal addresses to suggest a different messaging application such as email if apparent email addresses are in the input, analysis of certain content types to select a specific email account, or to interpret addresses/attachments/text in a completely different context such as searching for device/cloud content that matches those attributes or launches a completely unrelated application such as a social networking application that employs the same inputs to post an image attachment with descriptive text on the home pages of users identified by the email/phone destinations.

Natural language parsers are one way to contextually interpret ambiguous command strings that could have multiple meanings. Computing power currently limits true natural language parsers to being network-hosted, such as SIRI available from APPLE INC. or GOOGLE NOW available from GOOGLE INC. The concepts and technologies disclosed herein, however, can utilize comparatively modest on-device computing power sufficient to identify attributes of typed, spoken, or otherwise provided input elements and relate the input elements to one or more likely actions.

The concepts and technologies disclosed herein allow users to avoid the act of selecting an application. An additional advantage of the concepts and technologies disclosed herein is that given a set of data that might be reasonably applied to different applications, the ongoing offer of the device to confirm the use of one of the applications allows the user to retain choice over the application part way into data entry. This choice would not be possible if the user had already preselected an application from the start in accordance with traditional application-centric usage models. More broadly, the concepts and technologies disclosed herein apply flexible and contextual interpretation of provided data input without initially assuming any particular interpretation or utilization.

Various interpretations of typed characters are described herein but the input can include any sort of equivalent expression of characters such as speech, or very abstract associations such as a hummed melody line as a substitute for a forgotten song name that suggests the device play a song with that signature, a touch or swipe pattern on a keyboard that resembles the actions noted during past playing of a game, or selecting "objects" to commence an input stream from a collection of a desktop pool of avatars representing a mix of people, recent messages, recent files, or other inputs that could be related to functions provided by a device.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of predictive determination of actions will be presented.

Referring now to FIG. 1, aspects of an operating environment 100 in which various embodiments presented herein may be implemented will be described, according to an illustrative embodiment. The illustrated operating environment 100 includes a user 102 (represented throughout as one or more hands) who is holding a user device 104. The user device 104, in some embodiments, is or includes a desktop computer, laptop computer, a notebook computer, a tablet computer, a netbook computer, a mobile telephone, a smartphone, a feature phone, a video game system, a handheld video game system, a set-top box, a vehicle computing system, a smart watch, a personal fitness tracker, a safety device, a wearable device, a music playback device, a video playback device, an internet appliance, a television, a personal digital assistant ("PDA"), combinations thereof, or the like. It should be understood that the functionality of the user device 104 can be provided by a single device, by two or more similar devices, and/or by two or more dissimilar devices.

The illustrated user device 104 includes one or more processor(s) 106, one or more memory components 108, one or more network components 110, an action determination module 112, one or more applications 114, and one or more operating systems 116. The user device 104 can utilize the processor(s) 106 to execute instructions associated with the action determination module 112, the application(s) 114, and/or the operating system(s) 116. The action determination module 112, the application(s) 114, and/or the operating system(s) 116 can be stored in the memory component(s) 108. The memory component(s) 108 can include any computer storage medium, including, for example, volatile and non-volatile, removable and non-removable media implemented in any method or technology for storage of information such as computer-readable instructions, one or more data structures, one or more program modules (e.g., the action determination module 112), one or more operating systems (e.g., the operating system(s) 116), one or more applications (e.g., the application(s) 114), and/or other data. More particularly, the memory component(s) 108 can include, but are not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the user device 104. In the claims, the phrase "computer storage medium" and variations thereof does not include waves or signals per se and/or communication media.

The action determination module 112 can be executed by the processor(s) 106 to perform operations described herein, including, but not limited to, operations described herein below with reference to a method 400 shown in FIGS. 4A-4C. The action determination module 112 can be executed by the processor(s) 106 to facilitate receipt of data input, to analyze the data input to apply flexible and contextual interpretation of the data input without assuming any particular interpretation of the data input nor any particular utilization of the data input. In other words, the operations performed by the action determination module 112 functions independent of other applications, such as the applications 114, or what is otherwise referred to herein as "application agnostic."

FIGS. 2A-2G illustrate an exemplary user interface through which a user may type characters as input to be interpreted by the action determination module 112. It should be understood, however, that the action determination module 112 can be configured to receive data as any sort of equivalent expression of typed characters, including, for example, speech, abstract associations such as a hummed melody line as a substitute for a forgotten song name that suggests the user device 104 to play a song having that melody line, a touch or swipe pattern on an on-screen keyboard (best shown in FIGS. 2B-2G and 3A-3E) that resembles one or more actions noted during past playing of a game (such as a game application included in the application(s) 114), or selecting one or more "objects" to commence an input stream from a collection of desktop pool of avatars representing a mix of people, recent messages, recent files, or other inputs that could be related to one or more functions provided by the user device 104. The action determination module 112 can be a standalone application or can be part of the operating system 116. In some embodiments, operations available from the action determination module 112 can be exposed via one or more application programming interfaces ("APIs") (not shown).

The application(s) 114 can include, but are not limited to, productivity applications, entertainment applications, video applications, music applications, video game applications, camera applications, messaging applications, social network applications, enterprise applications, map applications, security applications, presence applications, visual voice mail applications, text-to-speech applications, speech-to-text applications, email applications, calendar applications, camera applications, web browser applications, and the like. The application(s) 114 can execute on top of the operating system(s) 116. The operating system(s) 116 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The operating system(s) 116 can include a program for controlling the operation of the user device 104. The operating system(s) 116 can be executed by the processor(s) 106 to cause the user device 104 to perform various operations. The operating system(s) 116 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

In the illustrated example, the user device 104 is in communication with a network 118 via the network component(s) 110. The network 118, in some embodiments, can be or can include one or more wireless personal area networks ("WPANs"), one or more wireless local area networks ("WLANs"), one or more wireless wide area networks ("WWANS"), one or more wireless metropolitan area networks ("WMANs"), one or more campus area networks ("CANs"), and/or one or more packet data networks, such as the internet or a portion thereof.

The network 118 may use any wireless communications technology or combination of wireless communications technologies, some examples of which include, but are not limited to, BLUETOOTH, ZIGBEE, WI-FI, WI-FI peer-to-peer, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other Institute of Electrical and Electronics Engineers ("IEEE") 802.XX technologies, and the like.

The network 118 embodied as a WWAN may operate using various channel access methods (which may or may not be used by the aforementioned technologies), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like. Data may be exchanged via the communications network using cellular data technologies such as, but not limited to, General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies.

The network component(s) 110 can be or can include one or more transceivers. The transceiver(s), if included, can be configured to communicate over the same and/or different wireless technology standards. For example, in some embodiments, the transceiver(s) may be configured to communicate using GSM, CDMA, CDMAONE, CDMA2000, LTE, and various other 2G, 2.5G, 3G, 4G, and greater generation technology standards. Moreover, the transceiver(s) may facilitate communications over various channel access methods (which may or may not be used by the aforementioned standards) including, but not limited to, TDMA, FDMA, W-CDMA, OFDM, SDMA, and the like.

The network component(s) 110 may facilitate data communications using GPRS, EDGE, the HSPA protocol family, including HSDPA, EUL or otherwise termed HSUPA, HSPA+, and various other current and future wireless data access standards. The network component(s) 110 may include one or more transceivers for supporting other types and/or standards of communications, such as, for example, WI-FI, WIMAX, BLUETOOTH, infrared, infrared data association ("IRDA"), near-field communications ("NFC"), ZIGBEE, other RF technologies, combinations thereof, and the like.

The network 118 can provide the user device 104 access to one or more services 120. The service(s) 120 can include any service(s) that is/are accessible via a network connection. For example, the service(s) 120 can be or can include a short messaging service ("SMS"), a multimedia message service ("MMS"), a voice call service, a voice over internet protocol ("VoIP") service, a voice over LTE ("VoLTE") service, a video call service, a media streaming service (e.g., a music or video service), a media download service, a web service, a data storage service, a television service, any combination thereof, and the like.

The illustrated user device 104 also includes a display 122. The display 122 can present a user input interface 124 and one or more action options 126 (shown as action option A 126A through action option N 126N). The user input interface 124 is presented on the display 122 by the action determination module 112. The user input interface 124 is application agnostic. In other words, the user input interface 124 can receive input from the user 102 that is useable by one or more applications, such as the application(s) 114, as determined by the action determination module 112.

The user input interface 124 can provide a visual representation of input provided by the user 102. For example, the user input interface 124 can present text associated with an input provided by the user 102. The text can be generated by the user device 104 based upon text entered, for example, via a hardware or software keyboard of the user device 104. Alternatively, the text can be generated by the user device 104 in response to user voice input through speech-to-text functionality, which may be provided, at least in part, by the application(s) 114 and/or the operating system(s) 116. The user input interface 124 can include a text-based indication of one or more non-text inputs. For example, an image can be represented in the user input interface 124 by the word "image" or multiple images can be represented in the user input interface 124 by "X image(s)," where X represents the number of images. Sounds also can be represented. For example, a sound can be represented in the user input interface 124 by the word "sound," "music," "song," or any other word representative of a sound input to the user device 104. In addition to or as an alternative to text-based representations of non-text inputs, such as images and sounds, one or more icons can be shown in the user input interface 124 to convey to the user 102 the type(s) of input interpreted by the action determination module 112. For example, a music note, speaker, or talking head may be used to represent sound or different types of sound, and a camera icon, picture frame, drawing, or like icon can be used to represent an image or different types of images.

Figure 5:
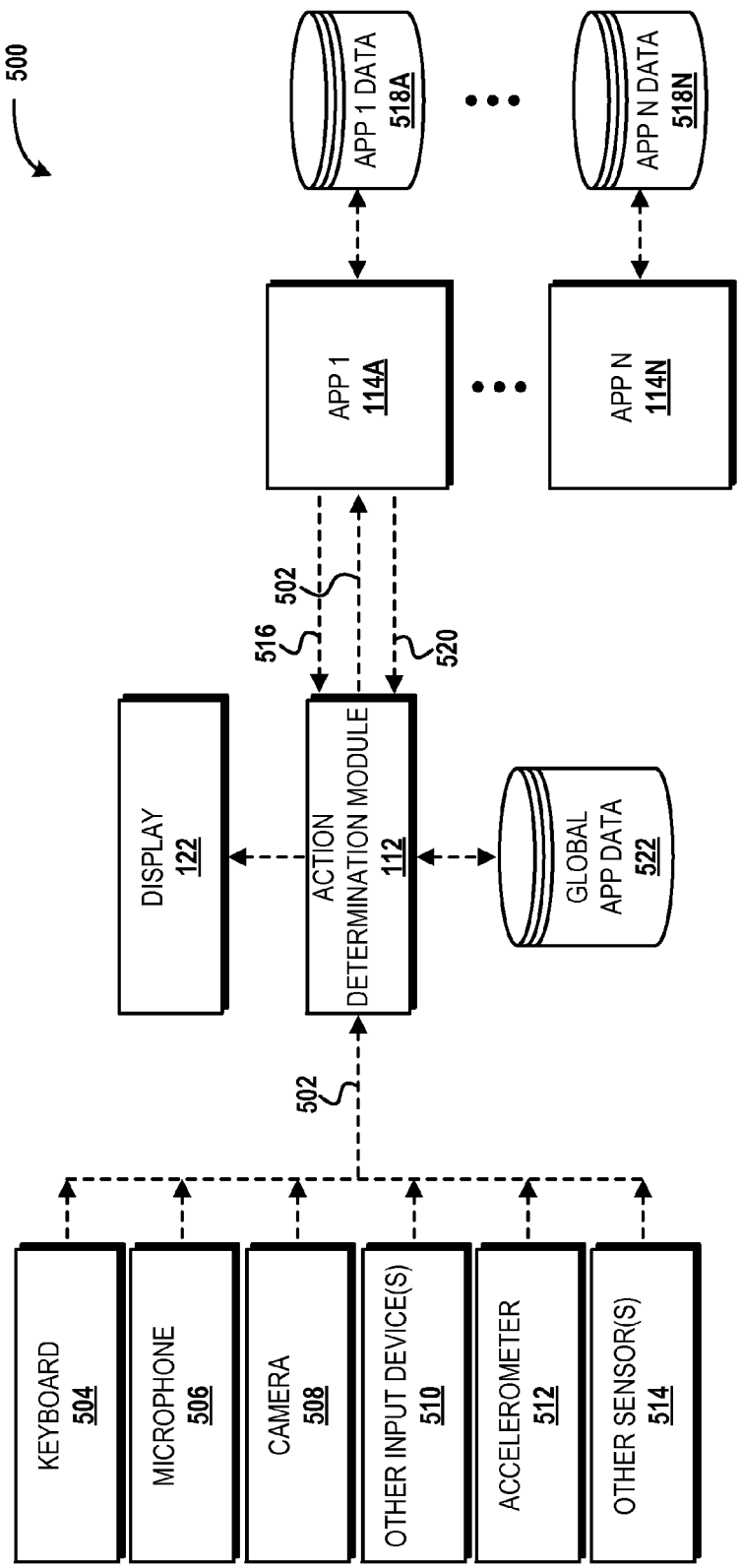
FIG. 5 is a system diagram illustrating aspects of interactions between an action determination module and applications, according to an illustrative embodiment.

The user input interface 124 can be triggered in response to a user trigger. The user trigger, in some embodiments, is one or more button presses, such as, for example, the user 102 pressing a hardware button 128. The user trigger can include single or multiple button presses of the same or different hardware and/or software buttons (e.g., one or more buttons of a software keyboard) in any sequence or combination. The user trigger, in some embodiments, is a gesture, such as the user 102 shaking the user device 104 as detected via one or more sensors (e.g., a gyroscope and/or accelerometer as best shown in FIG. 5). The user trigger, in some embodiments, is a sound generated by the user 102 (e.g., the user 102 speaking a word or phrase, or the user 102 singing, humming or otherwise making sound) or an environmental sound (e.g., music playing in the background). Other user triggers are contemplated. The user trigger, in some embodiments, is a combination of any of the aforementioned triggers.

A state of receptiveness to user input need not be explicitly triggered. The user device 104, in some embodiments, has the ability to continuously monitor input such as speech with minimal or no triggering (where the boundary is meant to instantiate a period of listening that reduces false alarms). Other soft triggers can include, but are not limited to, visual detection of a head or body part movement by a front-facing camera, an infrared or proximity sensor that detects the presence of a body, combinations thereof, and the like. These examples of explicit or likely interest of a user can be mentioned as other triggers or which elevate device sensitivity to input. There can also be use cases where a person is present all the time and the trigger might be other conditions such as the passage of a specific period of time (e.g., 5 minutes), or automatic playing upon arrival of a voice recording that puts the device in a heightened state of readiness to receive input in the context of the voice recording, or a meeting reminder goes off that sets a temporarily elevated "meeting related" context for interpreting input.

After receipt of data input, the user input interface 124 can pass the data input to the action determination module 112, which can analyze the data input to provide an interpretation of what the data input could be used for. As the user 102 provides further data input, the interpretation provided by the action determination module 112 can be narrowed and the action options 126 can be changed accordingly. Several examples of the user input interface 124 and the action options 126 will now be described with reference to FIGS. 2A-2G and 3A-3E.

Figure 2A:
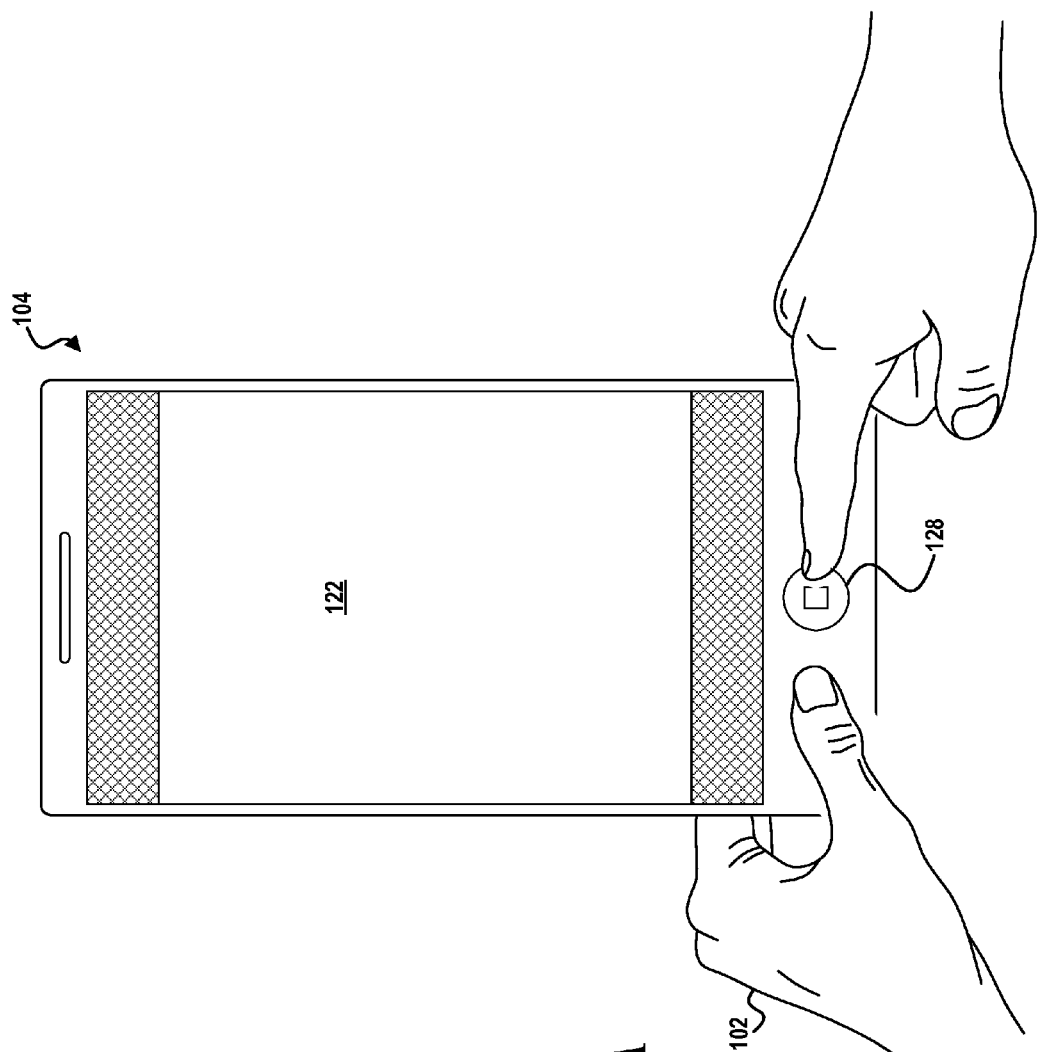
Figure 2B:
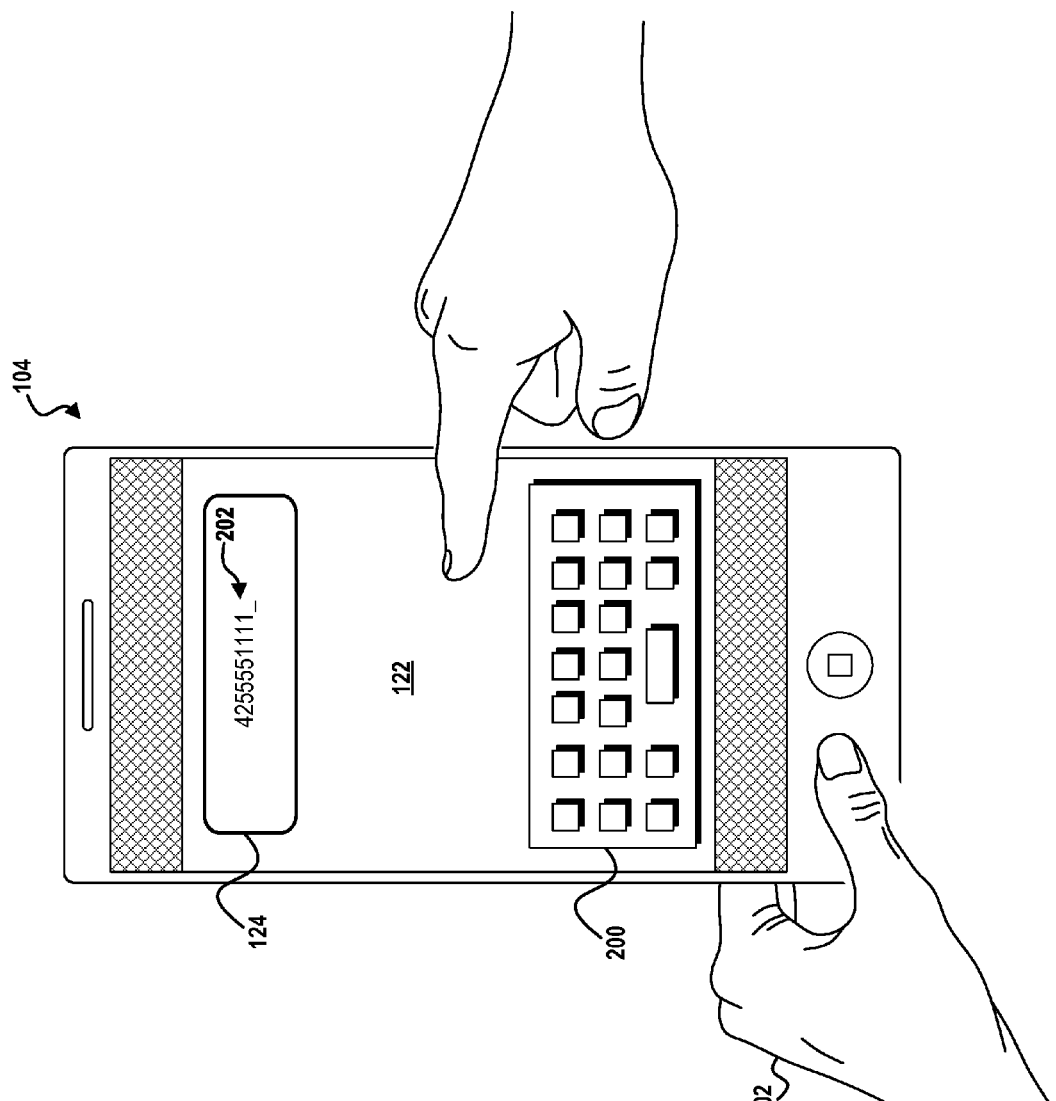

Turning now to FIG. 2A, the user device 104 is again shown being held by the user 102. In the illustrated example, the user 102 presses the hardware button 128, which triggers the action determination module 112 to present a software keyboard 200 and the user input interface 124 on the display 122 as shown in FIG. 2B. The user input interface 124 shown in FIG. 2B includes a number string 202 entered by the user 102 via the software keyboard 200. The action determination module 112 receives the number string 202 as input and analyzes the number string 202 to determine one or more action options. It should be understood that the action determination module 112 does not have to wait for a "full" string to be input. Moreover, a "full" string can be subjective unless the user explicitly terminates and identifies the end of the number string 202 with a space or a return. Likelihoods can be continuously calculated as input arrives and action options can start being displayed and updated as soon as a few digits become recognizable beyond some likely correct detection threshold.

Figure 2C:
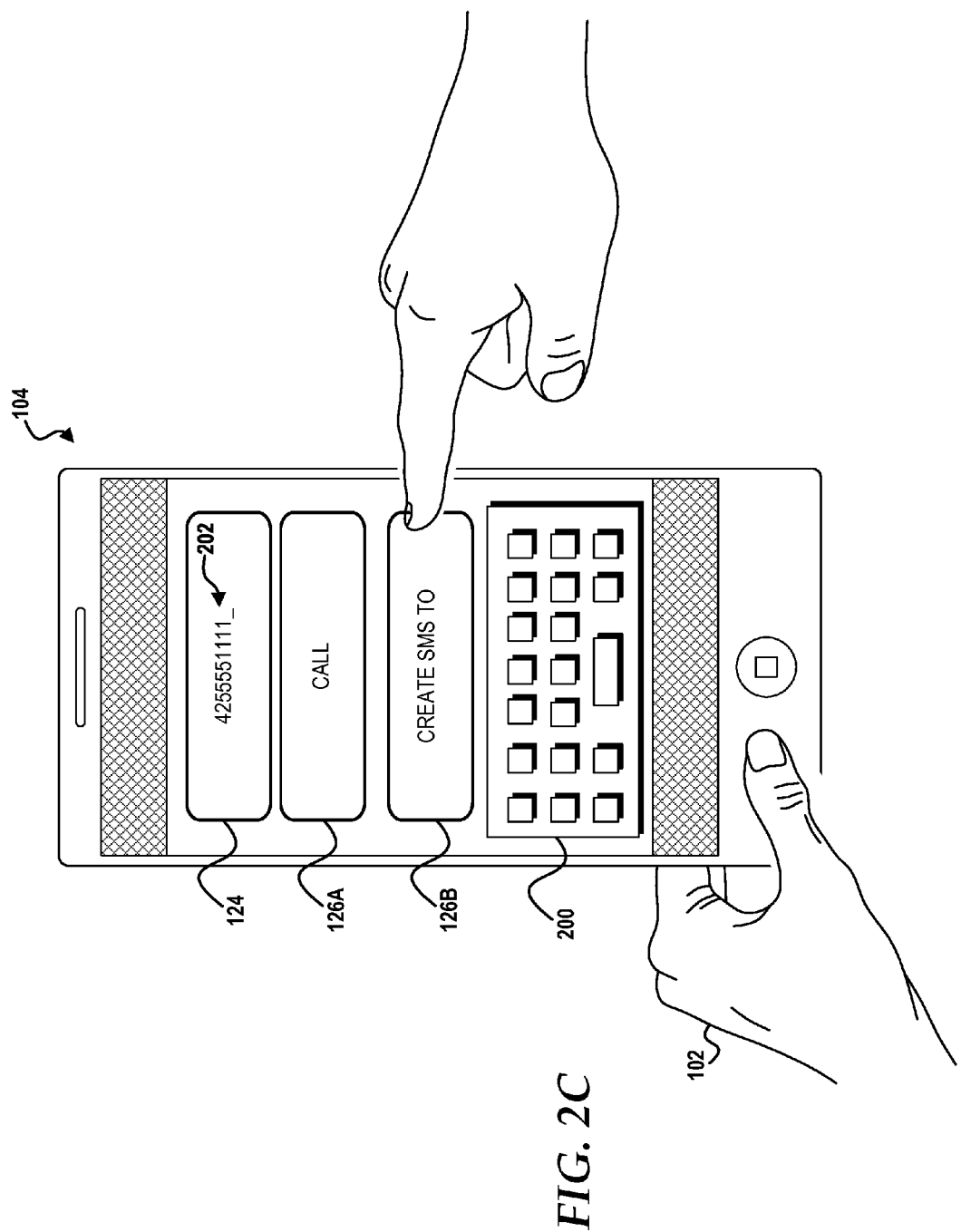

After the action determination module 112 receives the number string 202 as input and analyzes the number string 202 to determine one or more action options, the action determination module 112 can cause the display 122 to present the action option(s). In the example shown in FIG. 2C, the action options include a first action option 126A and a second action option 126B. The first action option 126A provides an option for the user 102 to place a call to a telephone number identified by the number string 202 using a phone application (e.g., as one of the applications 114) of the user device 104. The second action option 126B provides an option for the user 102 to send an SMS message to the telephone number identified by the number string 202 using a messaging application (e.g., one of the applications 114) of the user device 104. FIG. 2C also shows the user 102 selecting the second action option 126B.

Figure 2D:
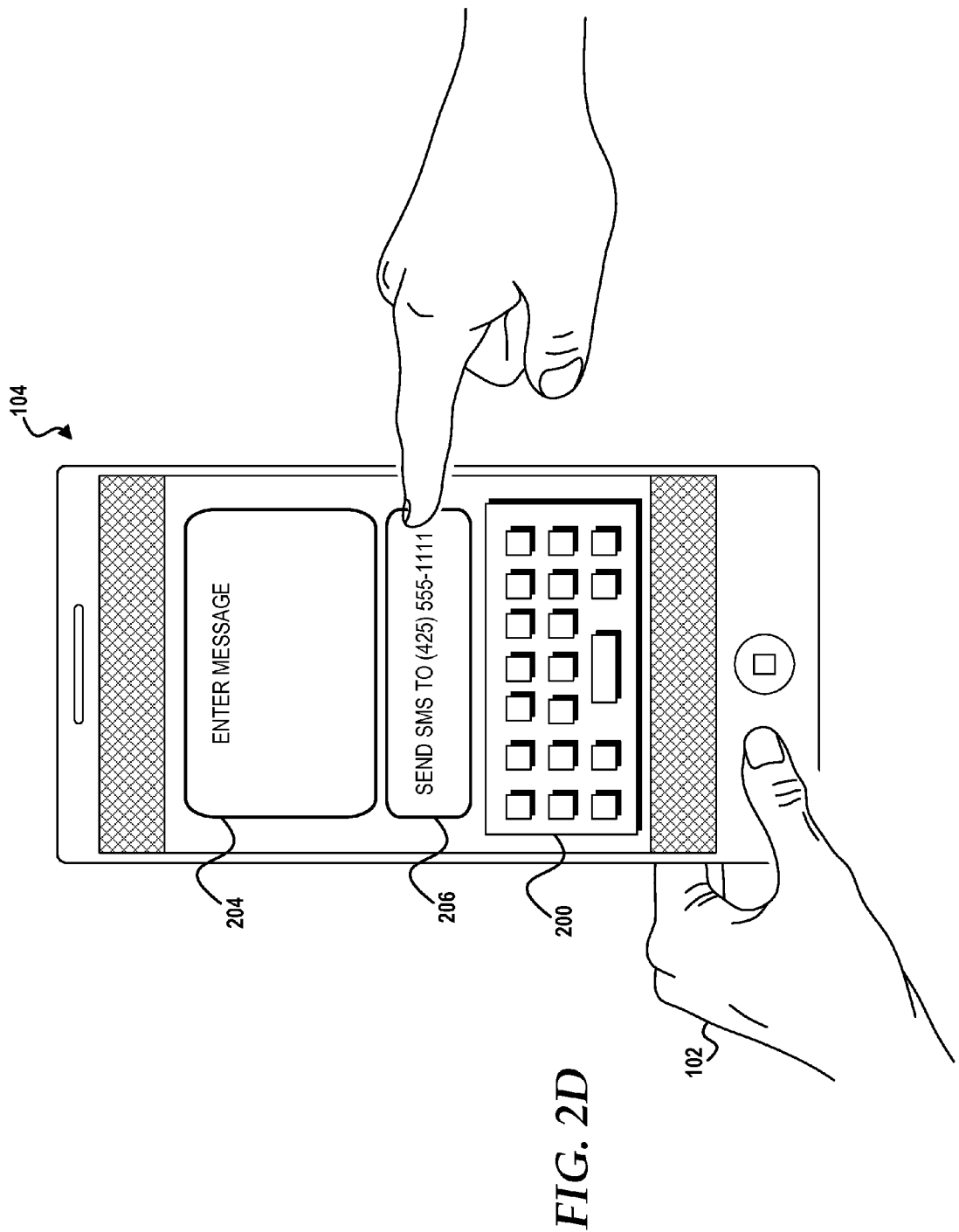

Turning now to FIG. 2D, in response to the user 102 selecting the second action option 126B, an "ENTER MESSAGE" prompt 204 can be presented to the user 102. The user 102 can then type a message to be sent as an SMS message to the telephone number identified by the number string 202 input earlier by the user 102. The user 102 can select a send SMS option 206 to send the SMS message to the telephone number. It should be understood that the messaging application that provides the "ENTER MES- SAGE" prompt 204 is not launched until after the user 102 selects the second action option 126B. In other words, the action determination module 112 can determine that a messaging application can utilize the number string 202 as a destination telephone number for delivery of an SMS message and that a phone application can utilize the number string 202 as a destination telephone number for a call, and the user 102 can then select the corresponding action option 126 to perform the action that he or she desires.

Figure 2E:
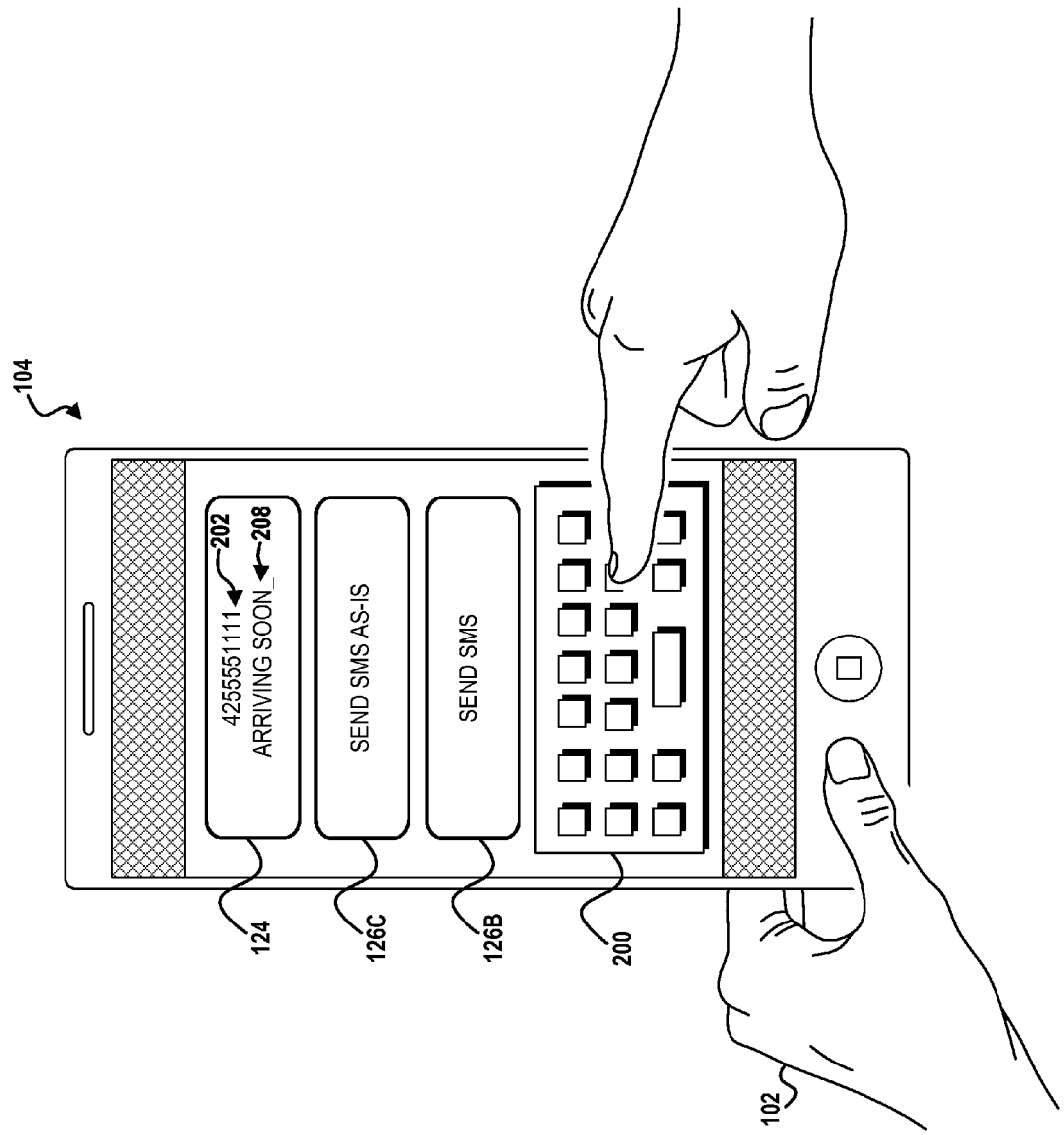

Turning now to FIG. 2E, the user input interface 124 now includes a text string 208 input by the user as a continuation of the number string 202 previously entered by the user 102 and the action options are updated in response. In particular, the action determination module 112 has determined the user input is no longer compatible with a call, and accordingly, the first action option 126A associated with an option for the user 102 to place a call to a telephone number identified by the number string 202 using a phone application is no longer presented on the display 122 and is now replaced with a third action option 126C. The third action option 126C provides an option for the user 102 to send an SMS message, using a messaging application (e.g., one of the applications 114) of the user device 104, to the telephone number identified by the number string 202 with the message as dictated by the text string 208. In other words, the third action option 126C allows the user 102 to send the SMS message as-is without changes.

Figure 2G:
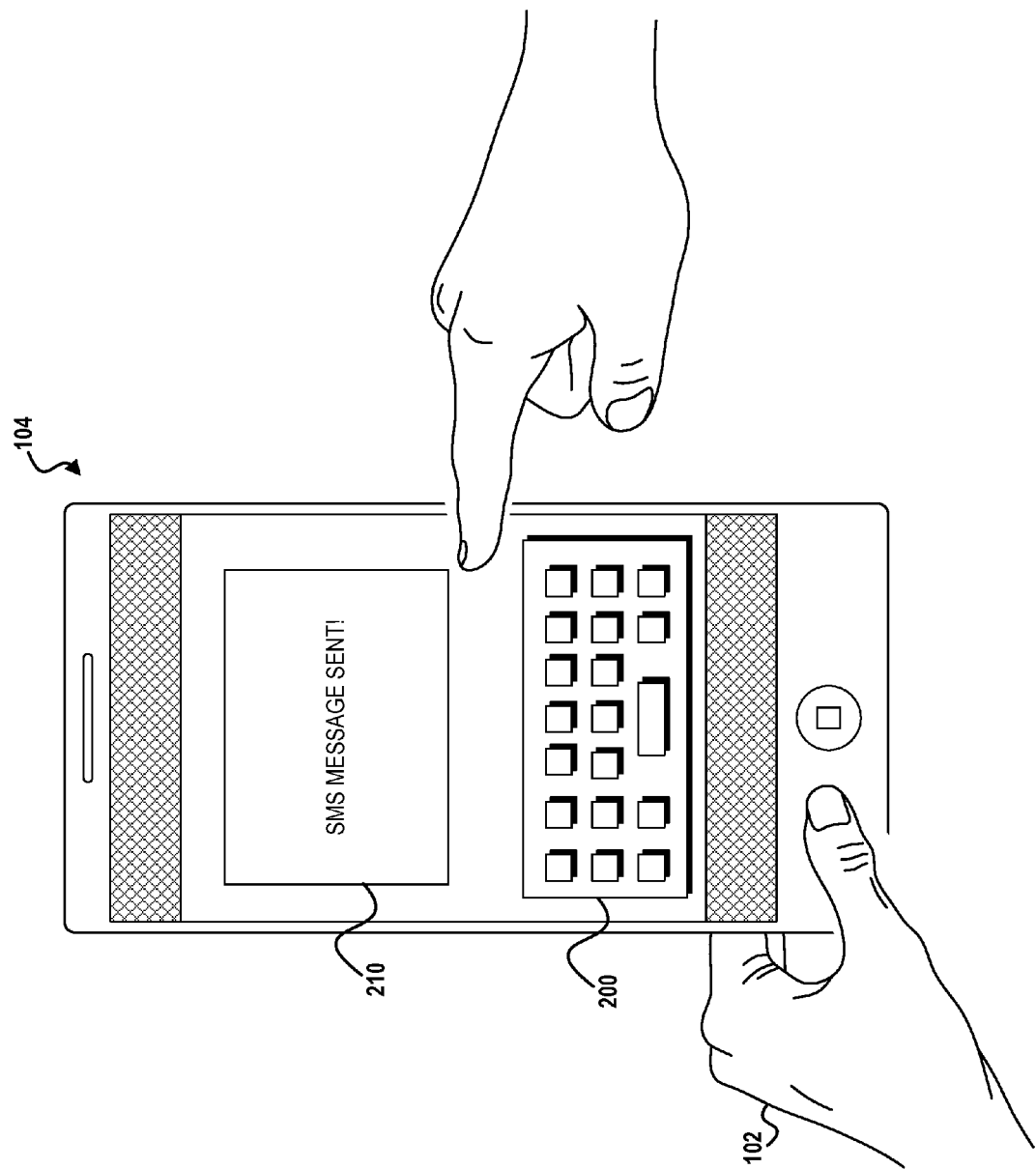

FIG. 2F shows the user 102 selecting the third action option 126C to send an SMS message with the message "ARRIVING SOON" to the telephone number identified by the number string 202. Turning now to FIG. 2G, in response to the user 102 selecting the third action option 126C, an SMS message sent confirmation 210 is presented on the display 122 to notify the user 102 that the message "ARRIVING SOON" was sent to the telephone number identified by the number string 202. The illustrated SMS message sent confirmation 210 is one non-limiting example of a confirmation message. As another example, the SMS message sent confirmation 210 can include the actual content of the SMS message as well as an indication of the destination. In the manner depicted in FIGS. 2A-2G, the user 102 can enter numbers and/or letters and, in response, the action determination module 112 can provide one or more action options without the user 102 having to first select and launch a particular application prior to providing the input.

Figure 3A:
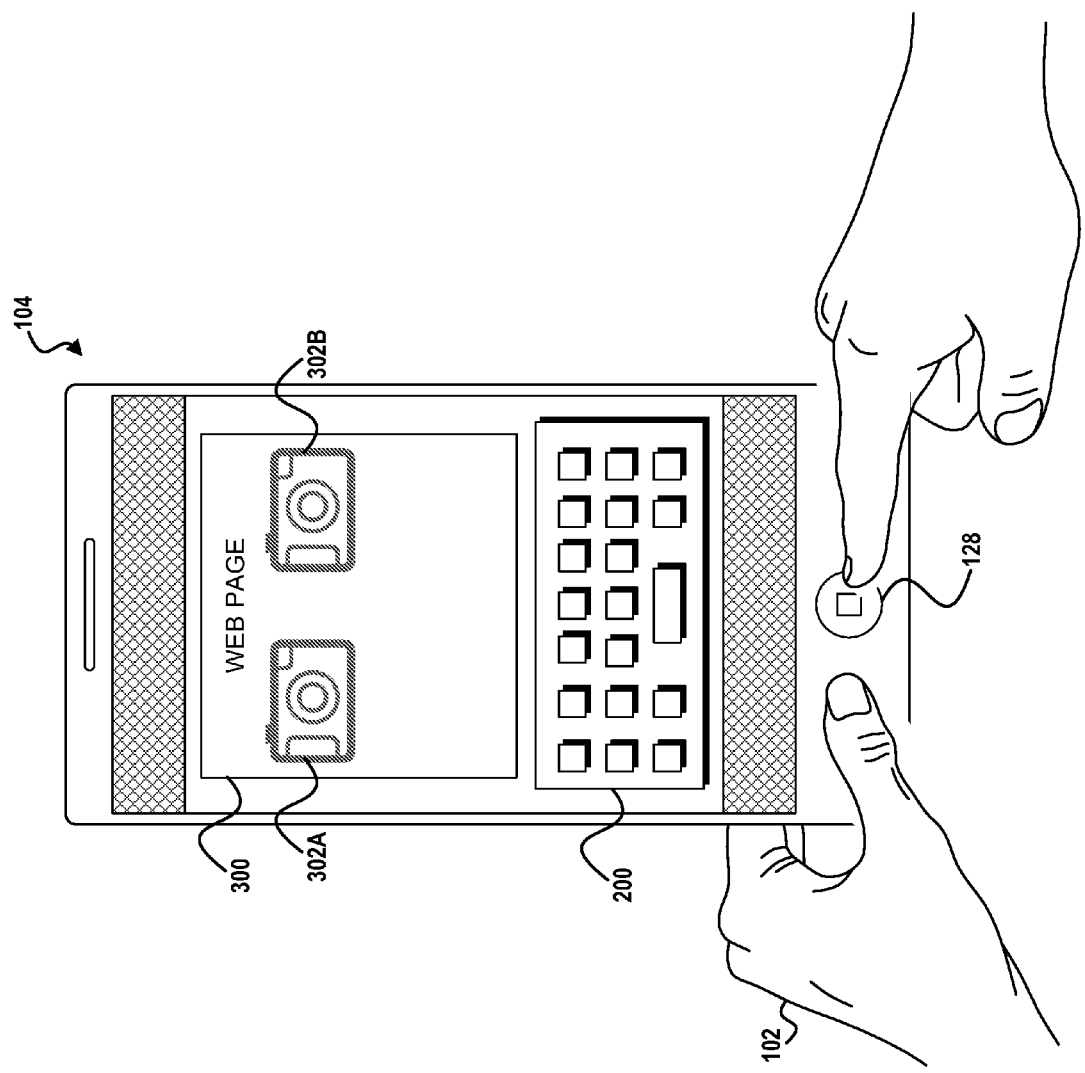
FIGS. 3A-3E are user interface diagrams illustrating aspects of a user input interface, according to illustrative embodiments.
Figure 3B:
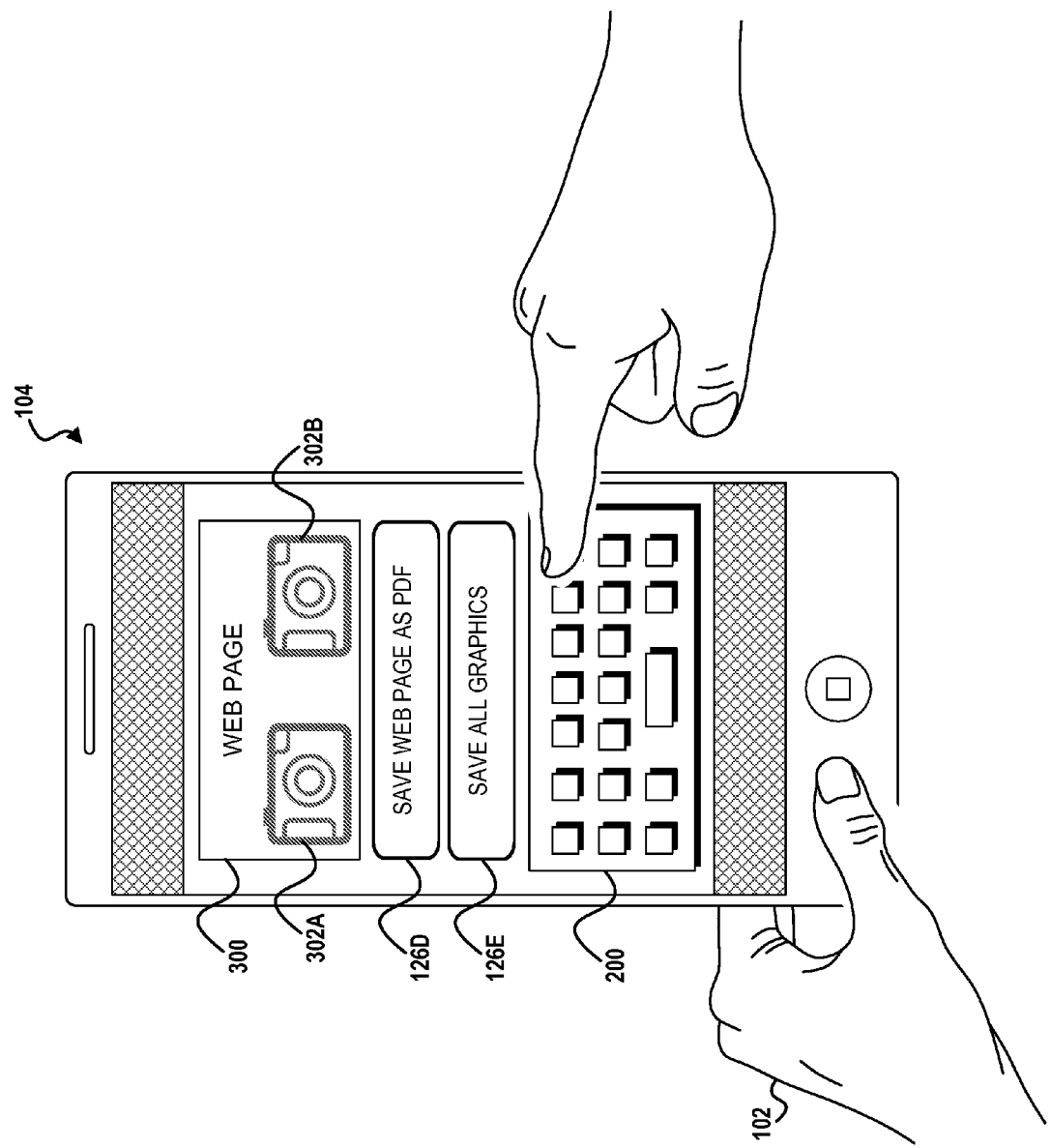

Turning now to FIG. 3A, the user device 104 is again shown being held by the user 102. In the illustrated example, the user 102 is browsing a web page 300 via a web browser application (e.g., one of the applications 114) of the user device 104. The web page 300 includes a plurality of images 302A-302B. The action determination module 112, executing in the background, can recognize the plurality of images 302A-302B and can determine one or more action options without user intervention, in response to a user trigger such as described above, or in the illustrated example, the user 102 pressing the hardware button 128, which triggers the action determination module 112 to present a fourth action option 126D and a fifth action option 126E as shown in FIG. 3B. The fourth action option 126D provides an option for the user 102 to save the web page 300 as a portable document format ("PDF") in the illustrated example, although other file formats are contemplated. The fifth action option 126E provides an option for the user 102 to save all graphics in the web page 300, which, again, in the illustrated example, include the plurality of images 302A-302B.

Figure 3C:
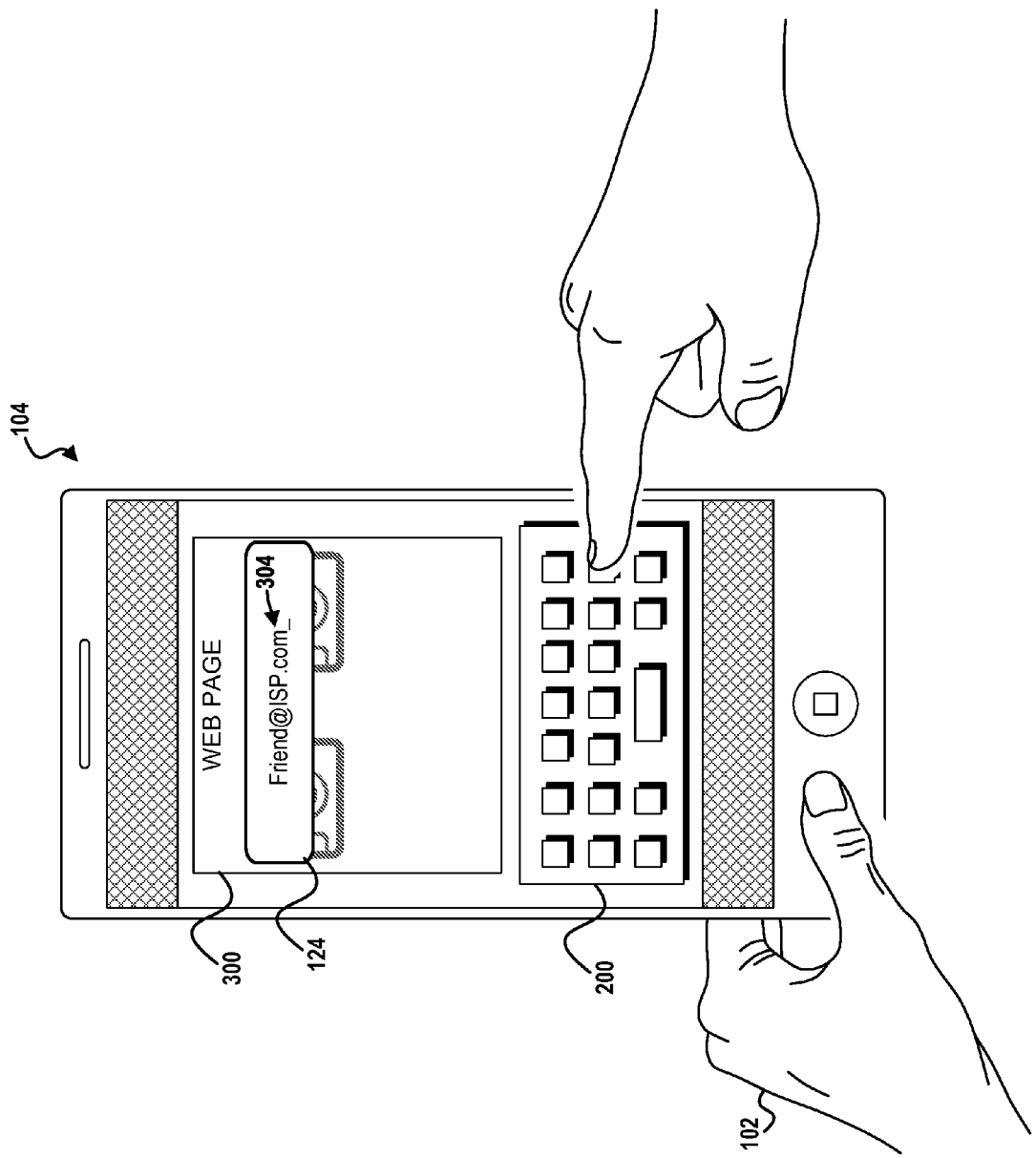
Figure 3D:
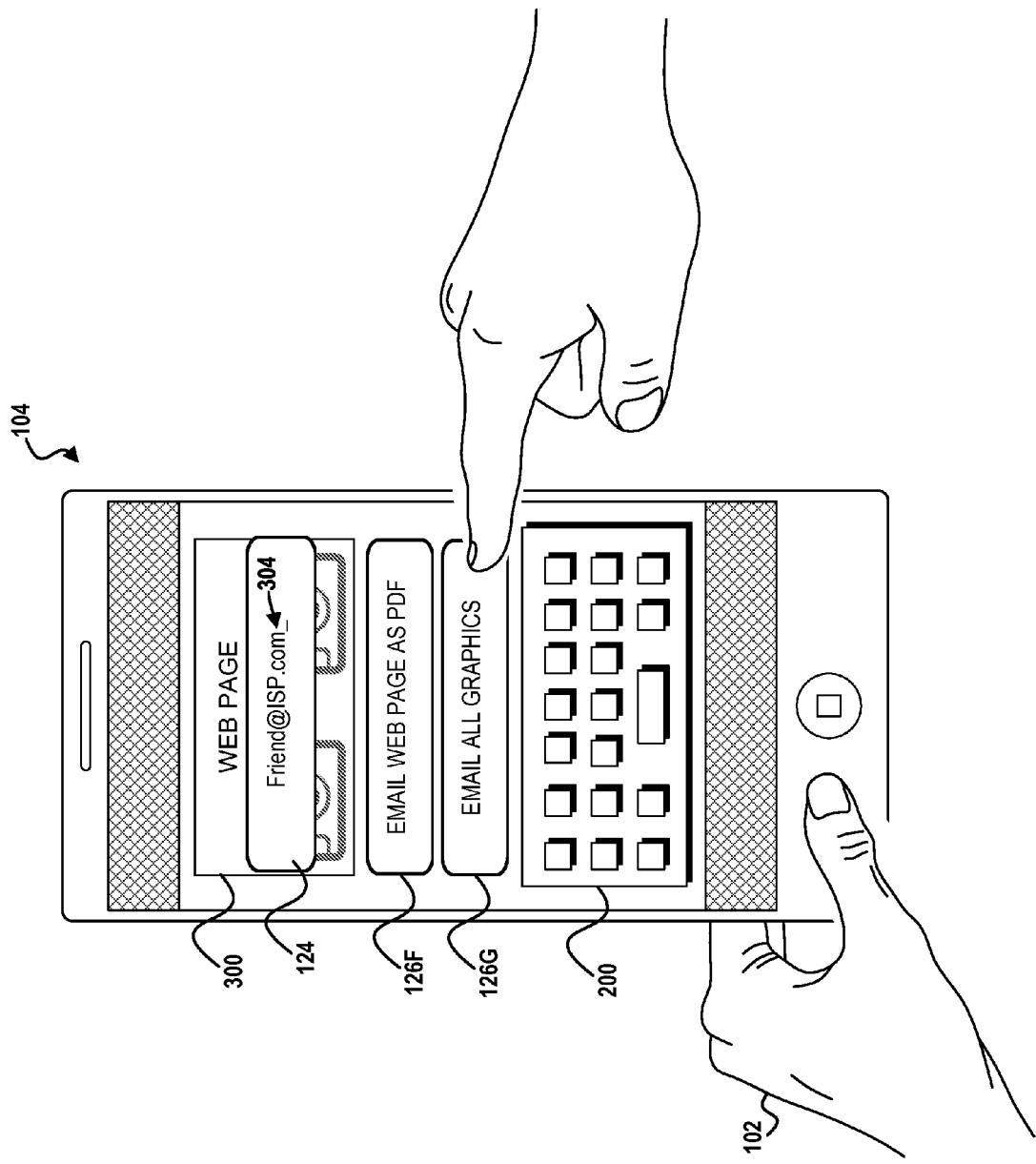

Turning now to FIG. 3C, the user 102 has begun typing via the software keyboard 200, thereby prompting the user input interface 124 to be presented. In the illustrated example, the user 102 has typed a character string 304. In response, the action determination module 112 can analyze the character string 304 to determine one or more action options, which, as shown in FIG. 3D, can include a sixth action option 126F and a seventh action option 126G. The sixth action option 126F provides an option for the user 102 to email the web page 300 as a PDF file. The seventh action option 126G provides an option for the user 102 to email all graphics in the web page 300, which, again, in the illustrated example, include the plurality of images 302A-302B. FIG. 3D shows the user 102 selecting the seventh action option 126G to email the plurality of images 302A-302B to the email address identified by the character string 304.

Figure 3E:
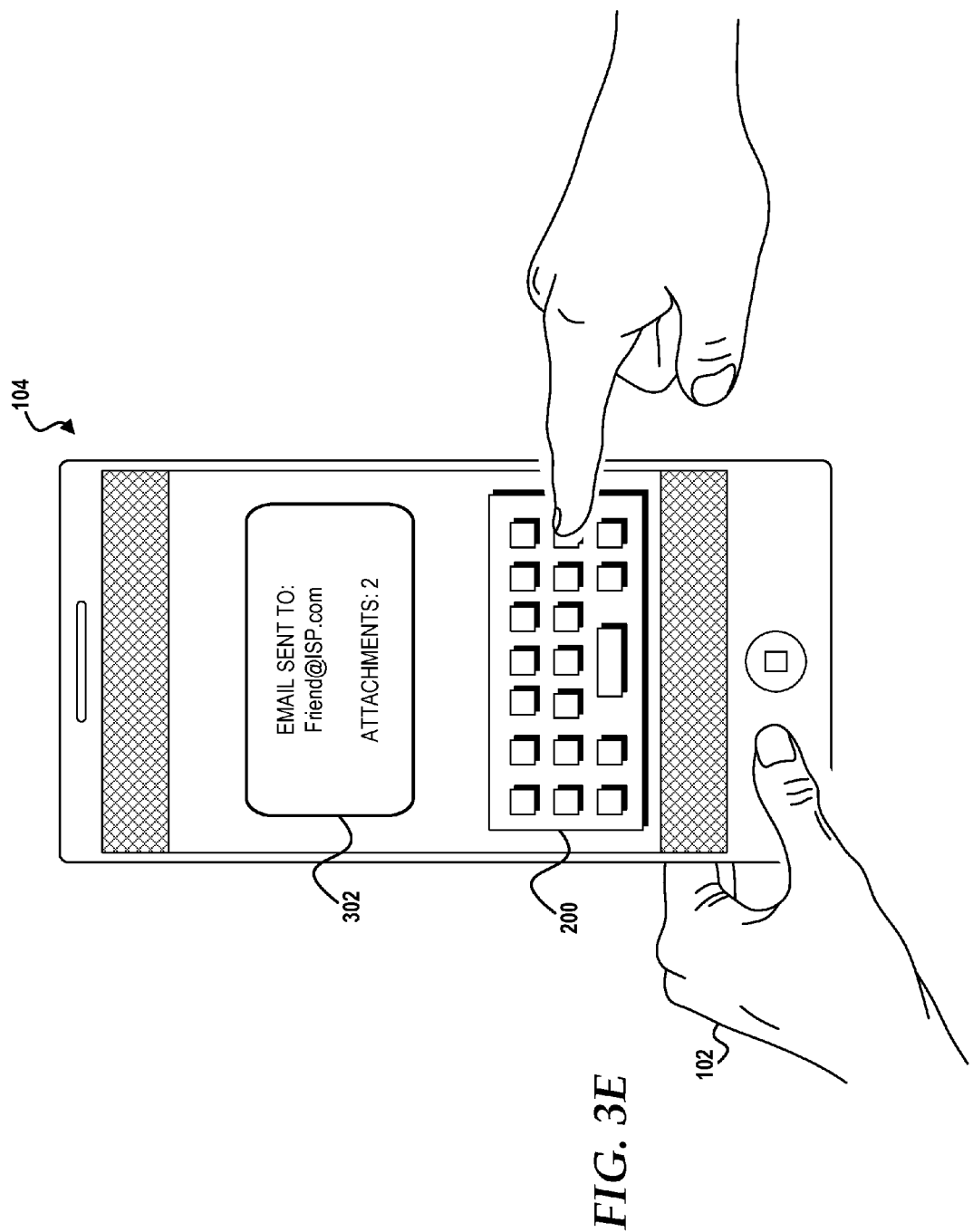

Turning now to FIG. 3E, in response to the user 102 selecting the seventh action option 126G, an email message sent confirmation 302 is presented on the display 122 to notify the user 102 that an email message containing the plurality of images 302A-302B has been sent to the email address identified by the character string 304. In the manner depicted in FIGS. 3A-3E, the user 102 can enter text at any time and, in response, the action determination module 112 can provide one or more action options without the user 102 having to actively initiate one or more applications, such as an email application and/or PDF conversion application, prior to providing the input.

Figure 4A:
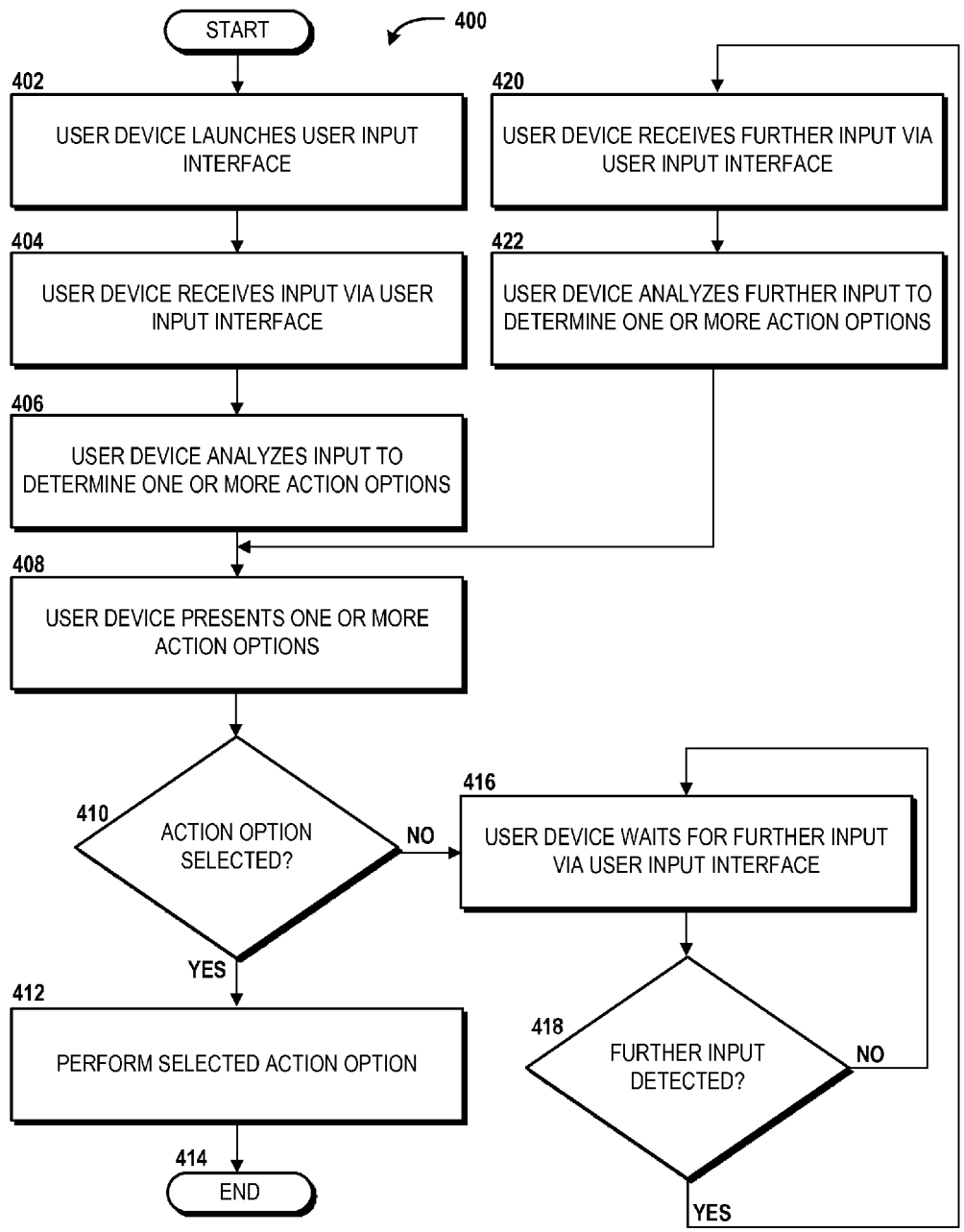
FIGS. 4A-4C are flow diagrams illustrating aspects of a method for predictive determination of one or more actions, according to an illustrative embodiment.
Figure 4B:
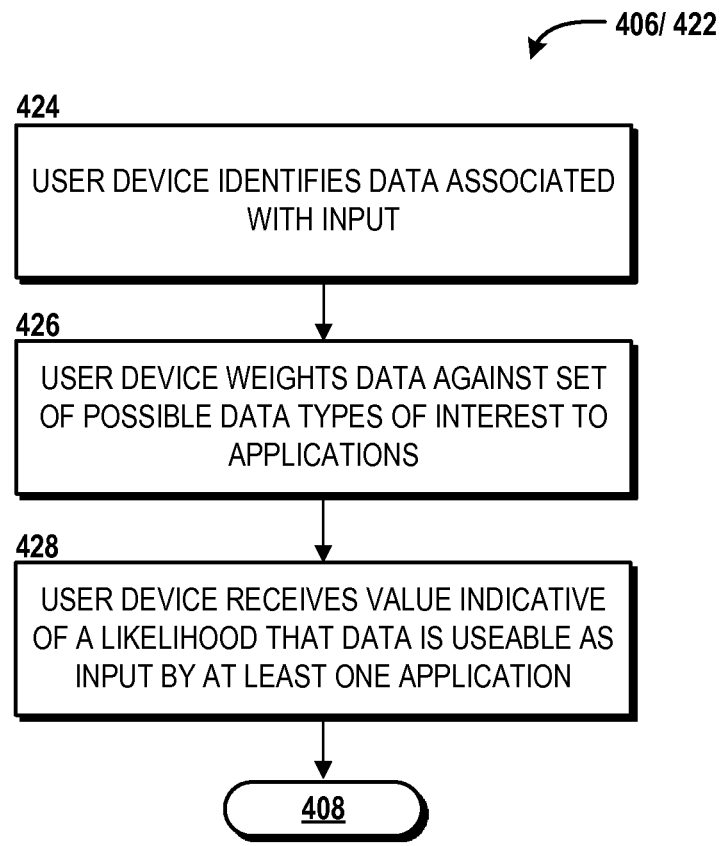
Figure 4C:
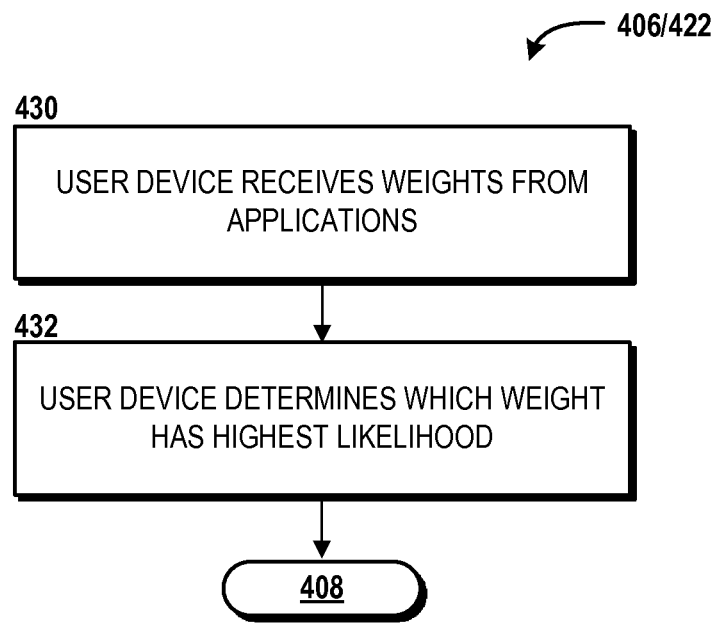

Turning now to FIGS. 4A-4C, aspects of a method 400 for predictive determination of one or more actions will be described, according to an illustrative embodiment. It should be understood that the operations of the methods are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in their respective entireties. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including the user device 104, single-processor or multiprocessor systems, minicomputers, mainframe computers, personal computers, hand-held computing devices, microprocessor-based, programmable consumer electronics, other devices and systems disclosed herein, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof refers to causing one or more processors, such as the processor(s) 106 of a computing system or device, such as the user device 104, another device disclosed herein, or another system disclosed herein, to perform one or more operations and/or causing the processor to direct other components of the computing system or device to perform one or more of the operations.

For purposes of illustrating and describing some of the concepts of the present disclosure, the methods disclosed herein are described as being performed, at least in part, by the user device 104 via execution, by the processor(s) 106, of one or more software modules and/or software applications, such as, for example, the action determination module 112, the application(s) 114, and/or the operating system(s) 116. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 400 will be described with reference to FIGS. 4A-4C and further reference to FIG. 1. The method 400 begins at operation 402, where the user device 104 launches the user input interface 124. The user input interface 124 can be presented on the display 122 of the user device 104. From operation 402, the method 400 proceeds to operation 404, where the user device 104 receives input via the user input interface 124.

From operation 404, the method 400 proceeds to operation 406, where the user device 104 analyzes the input to determine one or more action options 126 to be presented in response to the input. In some embodiments, the action determination module 112 can define one or more input attributes that associate with one or more actions. For example: a melody signature input may be associated with an action to playback a music file that contains the melody signature; a melody signature combined with an email address (i.e., an implicit destination), and text content may be associated with an action to email a music file that contains the melody signature to the email address with the text content in the subject line and/or body of an email message; a user's username, text content, and one or more attachments may be associated with an action to post the text content and the attachment(s) via a social networking application to a page of a social network that is associated with the email address; a telephone number (i.e., an implicit destination) may be associated with an action to place a call; a telephone number (i.e., an implicit source) and matching text content may be associated with an action to find an SMS message addressed to/from the telephone number; a telephone number (i.e., an implicit destination) and text content may be associated with an action to create and send an SMS message (see FIGS. 2E-2G); and a telephone number (i.e., an implicit destination), text content, and an attachment (e.g., a picture) may be associated with an action to create and send an MMS message.

From operation 406, the method 400 proceeds to operation 408, where the user device 104 presents (e.g., on the display 122) the one or more action options 126 determined at operation 406. From operation 408, the method 400 proceeds to operation 410, where the user device 104 determines whether an action option 126 has been selected. If an action option 126 has been selected, the method 400 proceeds to operation 412, where the user device 104 performs the action option 126 that was selected. From operation 412, the method 400 proceeds to operation 414. The method 400 ends at operation 414.

If, at operation 410, the user device 104 determines that an action option 126 has not been selected, the method 400 proceeds to operation 416. At operation 416, the user device 104 waits for further input via the user input interface 124. From operation 416, the method 400 proceeds to operation 418, where the user device 104 determines whether further input has been detected. If not, the method 400 returns to operation 416, where the user device 104 continues to wait for further input via the user input interface 124. If the user device 104 determines, at operation 418, that the further input has been detected, the method 400 proceeds to operation 420. At operation 420, the user device 104 receives further input via the user input interface 124. The method 400 then proceeds to operation 422, where the user device 104 analyzes the further input to determine one or more action options 126 to be presented in response to the further input. From operation 422, the method 400 returns to operation 408, where the user device 104 presents (e.g., on the display 122) the one or more action options 126 determined at operation 422. The method 400 then proceeds to operation 410 as described above.

Turning now to FIG. 4B, one example of an analysis that the user device 104 can perform at operation 406 and/or at operation 422 will be described. At operation 424, the user device 104 identifies data associated with the input/further input. At operation 426, the user device 104 weights the data against a set of possible data types of interest to a plurality of applications 114. At operation 428, the user device 104 receives, from at least one application 114 of the plurality of applications 114, a value indicative of a likelihood that the data is useable as input by the application(s) 114. In some embodiments, the user device 104 can present the action option 126 that is associated with an application 114 of the plurality of applications 114 having the value indicative of a highest likelihood that the data is useable as input. In some embodiments, the user device 104 can prioritize multiple applications 114 based upon corresponding likelihoods, and the action option 126 can include a plurality of action options 126 arranged based upon such prioritization.

An example of the action determination module 112 evaluating a substring against various data types using a global rule will be described. The input "555-1212" in a global evaluation is almost certainly a phone number. But the input could also be a quantity or a serial number. In one example architecture, a global interpretation and weighting engine can be used by the action determination module 112 to receive an input and rate how well the input fits a set of data types. The set of data types can be predefined or can include additional types that each newly installed application registers with the action determination module 112. As the numeric string is typed, evolving ratings of the input against the known data types might play out as follows:

"55"

Phone number: 0.1

Free text: 1.0 [at some point the system or an app created the free text data type which everything fits]

Canadian postal code: 0.0 [2 digits in a row disqualifies it from being a Canadian postal code]

US ZIP code: 0.2

Filename: 0.5 [there might be a file with "55" in its name on the device or in the user's cloud]

"555-12"

Phone number: 0.5

Free text: 1.0

Canadian postal code: 0.0

US ZIP code: 0.0 [because of the dash, but "55512" would probably hit at least 0.9 even if unverified as being valid, and would hit 1.0 if verified as being valid]
Filename: 0.0 [no matching filenames found on the device or in the user's cloud]
"555-1212"
Phone number: 0.9
Free text: 1.0
Canadian postal code: 0.0
US ZIP code: 0.0
Filename: 0.0

When an input string or substring is parsed by the action determination module 112 or one of the applications 114, the action determination module 112/application 114 may use a local dictionary, address book information, names of stored files, user's cloud data, history, some combination thereof, and/or the like to steer relevancy scoring. For example, "5551212" might reach a medium score as a phone number in the absence of any other context or stored data. If the number is found in an online phonebook resource, then the number might score medium-high as a phone number. If the number is matched by an explicit entry in the address book or in the dialing history, then the number might score very high as a phone number.

Continuing with the calculation of likelihoods, consider an input string [5551212 get milk] and assume the action determination module 112 knows of data types "phone_number", "local_filename", and "email". Scoring of the substrings might be as follows:
"5551212"
Phone_Number_Weight: 0.9
Filename_Weight: 0.0
Email_Weight: 0.0
"get"
Phone_Number_Weight: 0.0
Filename_Weight: 0.1 (there might be a file on the device where "get" is part of the filename)
Email_Weight: 0.0
"milk"
Phone_Number_Weight: 0.0
Filename_Weight: 0.0
Email_Weight: 0.0

A phone dialer application may have one action option 126 to evaluate and potentially offer as a scored action item. If exactly one substring scores above a threshold for being a phone number, and if no other text is present, extract the value of the likely phone number and return (action_option="Call", argument=phone_number) to the action determination module 112. In the above case, there are additional non-phone substrings that disqualify the Call action option 126 and nothing is returned (a statement of zero likelihood that the data is usable by the application 114).

An SMS application may have two action options 126 to evaluate and potentially offer: "Create SMS to" and "send SMS as-is." If exactly one substring scores above a threshold for being a phone number, and if no other substrings present, then extract the likely phone number and return (action_option=Create_SMS_To, argument1=phone_number). If exactly one substring scores above a threshold for being a phone number, and if other substrings present, then extract the likely phone number and treat remaining input as free text and return (action_option=Send_SMS_As_Is, argument1=phone_number, arguments="get milk"). Else if multiple substrings score above a threshold for being a phone number, return multiple action options 126 with each one treating each likely phone number as a destination and remaining input as free text. Else return nothing (i.e., if there are no likely phone numbers at all, then SMS under these rules is not possible).

In these examples, the returned action option 126 does not illustrate a likelihood value—that can be implicit by the fact that there is a returned action option 126, implicit in the order of a list of multiple action options 126, or the application could return a numeric score for each action option 126 calculated from the application's perspective, or let the action determination module 112 score the action option 126 globally with respect to other action options 126, preferences, history, and/or the like.

A collation for good user interface presentation should be done by the action determination module 112 to resolve independent results from multiple applications 114 because in a typical user device, such as a mobile smartphone, there is no coordination across applications 114. This sort of collation is vulnerable to aggressive applications 114 that try to apply formulas that might produce inflated numeric scores or long lists of action options 126 in the hopes of influencing the collation. As a result, the action determination module 112 can have some normalization responsibility when multiple applications 114 respond or that good behavior is designed in to applications 114 and devices from the beginning.

Turning now to FIG. 4C, another example of an analysis that the user device 104 can perform at operation 406 and/or at operation 422 will be described. At operation 430, the user device 104 receives weights from a plurality of applications 114. Each weight of the plurality of weights can be associated with a likelihood that a corresponding one of the plurality of applications 114 can utilize data associated with the input. At operation 432, the user device 104 determines which weight of the plurality of weight has a highest likelihood. In some embodiments, the user device 104 can present the action option 126 that is associated with an application 114 of the plurality of applications 114 associated with the weight of the plurality of weights that has the highest likelihoods. In some embodiments, the user device 104 can prioritize multiple applications 114 based upon corresponding likelihoods, and the action option 126 can include a plurality of action options 126 arranged based upon such prioritization.

Turning now to FIG. 5, a system diagram 500 illustrating aspects of interactions between the action determination module 112 and the application(s) 114 will be described, according to an illustrative embodiment. The illustrated examples show processing that is provided primarily by each of the applications 114. The action determination module 112 can normalize relevancy scores provided by each of the applications 114 using global application history, rules, and/or preferences to produce a final list of action options 126 to be presented on the display 122. Moreover, the illustrated example supports downloadable applications 114 that are not coordinated with existing applications 114 with respect to how relevancy values are calculated.

The system diagram 500 illustrates the action determination module 112, the display 122, and the application(s) 114 (now shown as APP 1 114A through APP N 114N). The system diagram 500 also illustrates input 502 provided by one or more input devices, some examples of which include a keyboard 504, a microphone 506, a camera 508, other input device(s) 510, an accelerometer 512, and other sensor(s) 514. The input 502 can be received by the action determination module 112 and provided to each of the applications 114. Hereinafter, the APP 1 114A will be used as an example.

The APP 1 114A can register application settings 516 with the action determination module 112. The application settings 516 can inform the action determination module 112 of the type of inputs the APP 1 114A can utilize in addition to other application information, including, for example, application version.

The APP 1 114A can receive the input 502 from the action determination module 112 alone or in combination with additional data. The APP 1 114A can parse the input 502 and relate the parsed input to one or more action options 126. The APP 1 114A also can calculate a relevancy score for each of the action options 126, and can refine the action options using APP 1 data 518A, which can include application history data, one or more rules, and one or more preferences. The APP 1 114A can provide a refined list of action options 126 and the corresponding relevancy scores 520 to the action determination module 112, which can further refine the list of action options 126 using global application data 522, which can include application history data, one or more rules, and one or more preferences for the APP 1 114A and one or more other applications 114 installed on the user device 104. The action determination module 112 can provide a final list of action options 126 to the display 122 for presentation.

Figure 6:
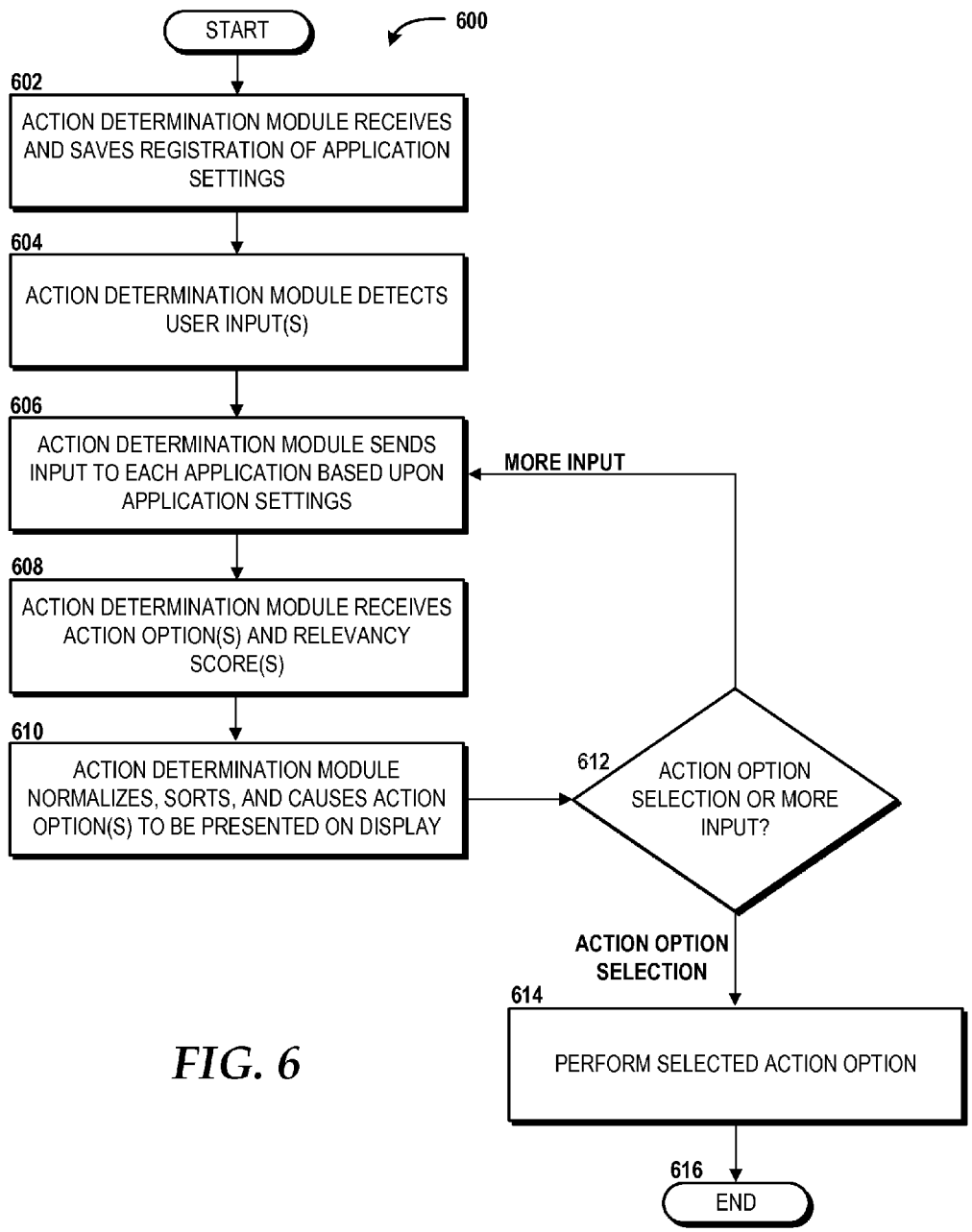
FIG. 6 is a flow diagram illustrating aspects of a method for processing an action determination module, according to an illustrative embodiment.

Turning now to FIG. 6, a method 600 for processing the action determination module 112 will be described, according to an illustrative embodiment. The method 600 will be described with reference to FIG. 6 and further reference to FIG. 5. The method 600 begins and proceeds to operation 602, where the action determination module 112 receives and saves registration of application settings from each of the applications 114. From operation 602, the method 600 proceeds to operation 604, where the action determination module 112 detects the input 502. From operation 604, the method 600 proceeds to operation 606, where the action determination module 112 sends the input 502 to each of the applications 114 for which the action determination module 112 received, at operation 602, registration of application settings.

From operation 606, the method 600 proceeds to operation 608, where the action determination module 112 receives one or more action options 126 and one or more corresponding relevancy scores from one or more of the applications 114. From operation 608, the method 600 proceeds to operation 610, where the action determination module 112 receives the action option(s) 126 and causes the action option(s) 126 to be presented on the display 122.

From operation 610, the method 600 proceeds to operation 612, where the action determination module 112 determines whether one of the action option(s) 126 has be selected or more input has been received. If more input is received, the method 600 returns to operation 606 and the method proceeds as described above. If, however, one of the action option(s) 126 is selected, the method 600 proceeds to operation 614, where the user device 104 performs the selected action option 126.

From operation 614, the method 600 proceeds to operation 616. The method 600 ends at operation 616.

Figure 7:
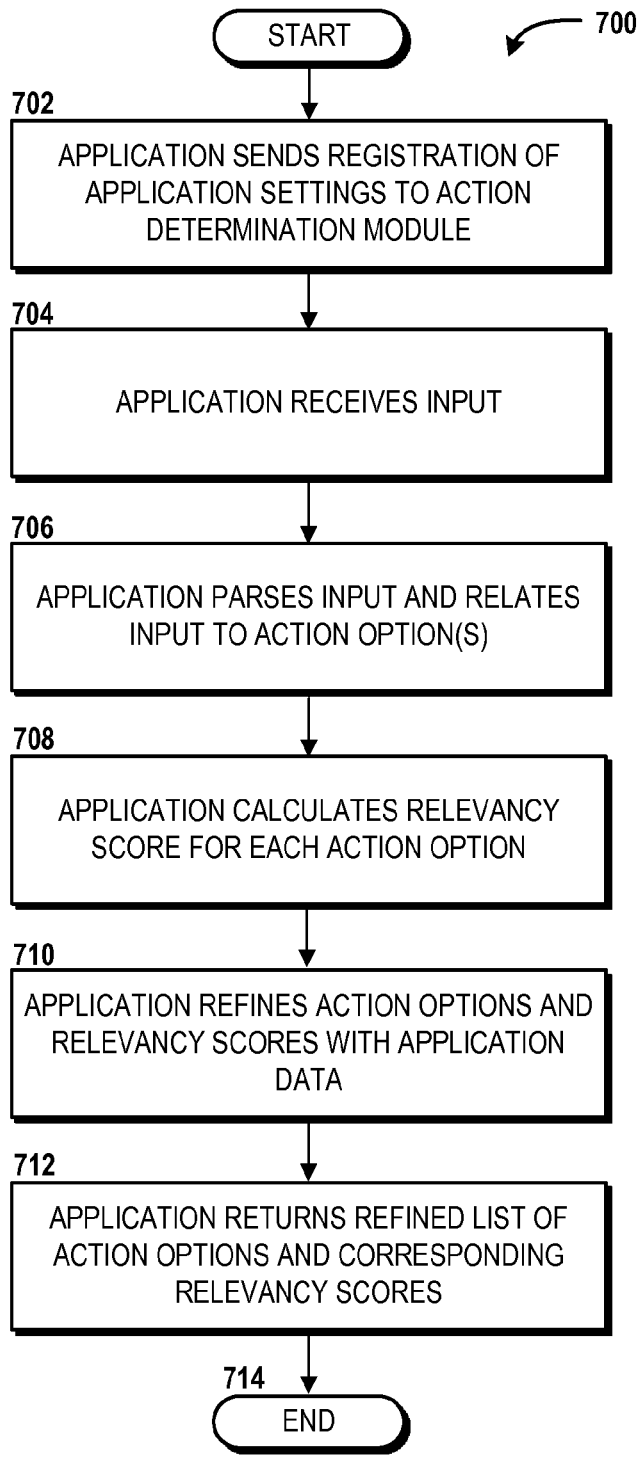
FIG. 7 is a flow diagram illustrating aspects of a method for processing an application, according to an illustrative embodiment.

Turning now to FIG. 7, a method 700 for processing an application, such as the APP 1 114A, will be described, according to an illustrative embodiment. The method 700 will be described with reference to FIG. 7 and further reference to FIG. 5. The method 700 begins and proceeds to operation 702, where the APP 1 114A sends registration of application settings 516 to the action determination module 112. From operation 702, the method 700 proceeds to operation 704, where the APP 1 114A receives the input 502 from the application determination module 112.

From operation 704, the method 700 proceeds to operation 706, where the APP 1 114A parses the input 502 and relates the input 502 to one or more action options 126. From operation 706, the method 700 proceeds to operation 708, where the APP 1 114A calculates a relevancy score for each action option 126. From operation 708, the method 700 proceeds to operation 710, where the APP 1 114A refines the action options 126 and relevancy scores using the APP 1 data 518A. From operation 710, the method 700 proceeds to operation 712, where the APP 1 114A returns a refined list of action options 126 and corresponding relevancy scores to the application determination module 112.

From operation 712, the method 700 proceeds to operation 714. The method 700 ends at operation 714.

Figure 8:
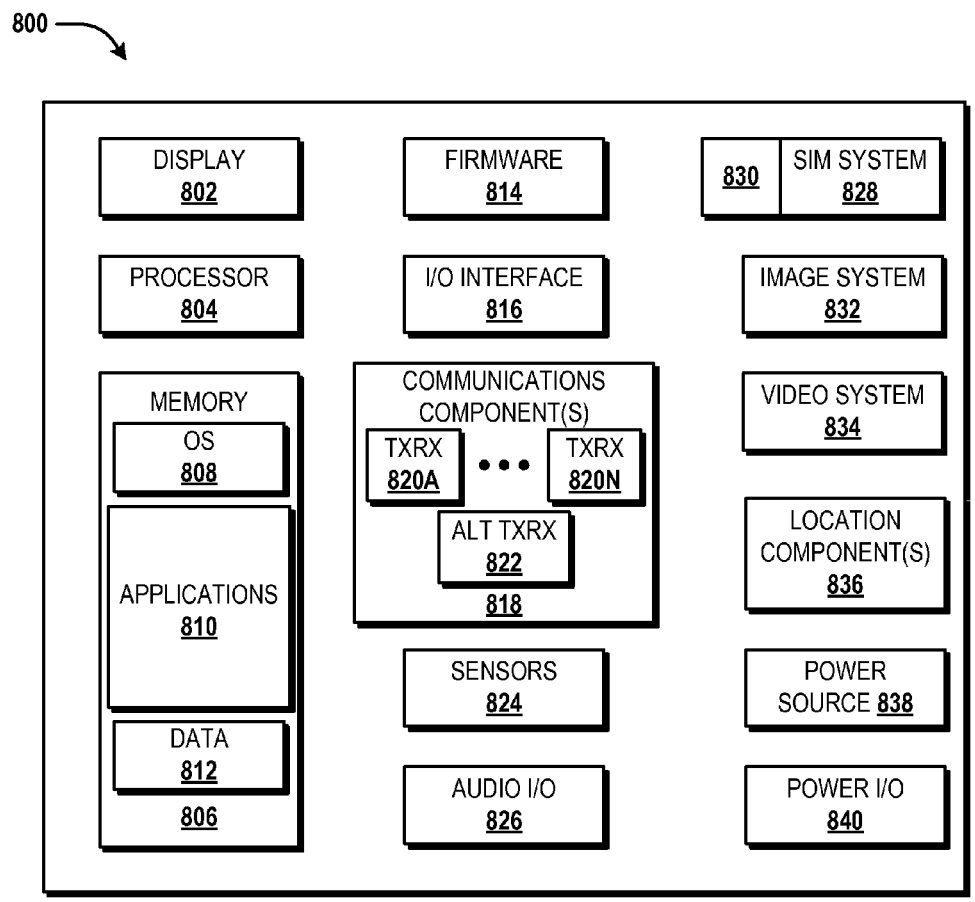
FIG. 8 is a block diagram illustrating an example mobile device capable of implementing aspects of the embodiments disclosed herein.

Turning now to FIG. 8, an illustrative mobile device 800 and components thereof will be described. In some embodiments, the user device 104 described above can be configured as and/or can have an architecture similar or identical to the mobile device 800 described herein in FIG. 8. It should be understood, however, that the user device 104 may or may not include the functionality described herein with reference to FIG. 8. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements, text, images, video, advertisements, various prompts, virtual keypads and/or keyboards, messaging data, notification messages, metadata, internet content, device status, time, date, calendar data, device preferences, map and location data, combinations thereof, and the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808 (e.g., the operating system(s) 116), one or more applications 810 (e.g., the action determination module 112 and the application(s) 114), other computer-executable instructions stored in a memory 806, or the like. In some embodiments, the applications 810 also can include a UI application (not illustrated in FIG. 8).

The UI application can interface with the operating system 808 to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, viewing account information, answering/initiating calls, entering/deleting data, entering and setting user IDs and passwords for device access, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include user preferences, user settings, and/or other data. The applications 810 can include, for example, the action determination module 112, the application(s) 114, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, user information, organization information, presence status information, user IDs, passwords, and application initiation (start-up) requests. In some embodiments, the I/O interface 816 can include a hardwire connection such as USB port, a mini-USB port, a micro-USB port, an audio jack, a PS2 port, an IEEE 1394 ("FIREWIRE") port, a serial port, a parallel port, an Ethernet (RJ48) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 118 described above herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using Global System for Mobile communication ("GSM"), Code Division Multiple Access ("CDMA"), CDMAONE, CDMA2000, Long-Term Evolution ("LTE"), and various other 2G, 2.8G, 3G, 4G, and greater generation technology standards. Moreover, the communications component 818 may facilitate communications over various channel access methods (which may or may not be used by the aforementioned standards) including, but not limited to, Time Division Multiple Access ("TDMA"), Frequency Division Multiple Access ("FDMA"), Wideband CDMA ("W-CDMA"), Orthogonal Frequency-Division multiplexing ("OFDM"), Space-Division Multiple Access ("SDMA"), and the like.

In addition, the communications component 818 may facilitate data communications using Generic Packet Radio Service ("GPRS"), Enhanced Date Rates for GSM Evolution ("EDGE"), the High-Speed Packet Access ("HSPA") protocol family, including High-Speed Downlink Packet Access ("HSDPA"), Enhanced Uplink ("EUL") or otherwise termed Highs-Speed Uplink Packet Access ("HSUPA"), HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, IRDA, NFC, other RF technologies, combinations thereof, and the like.

In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Figure 9:
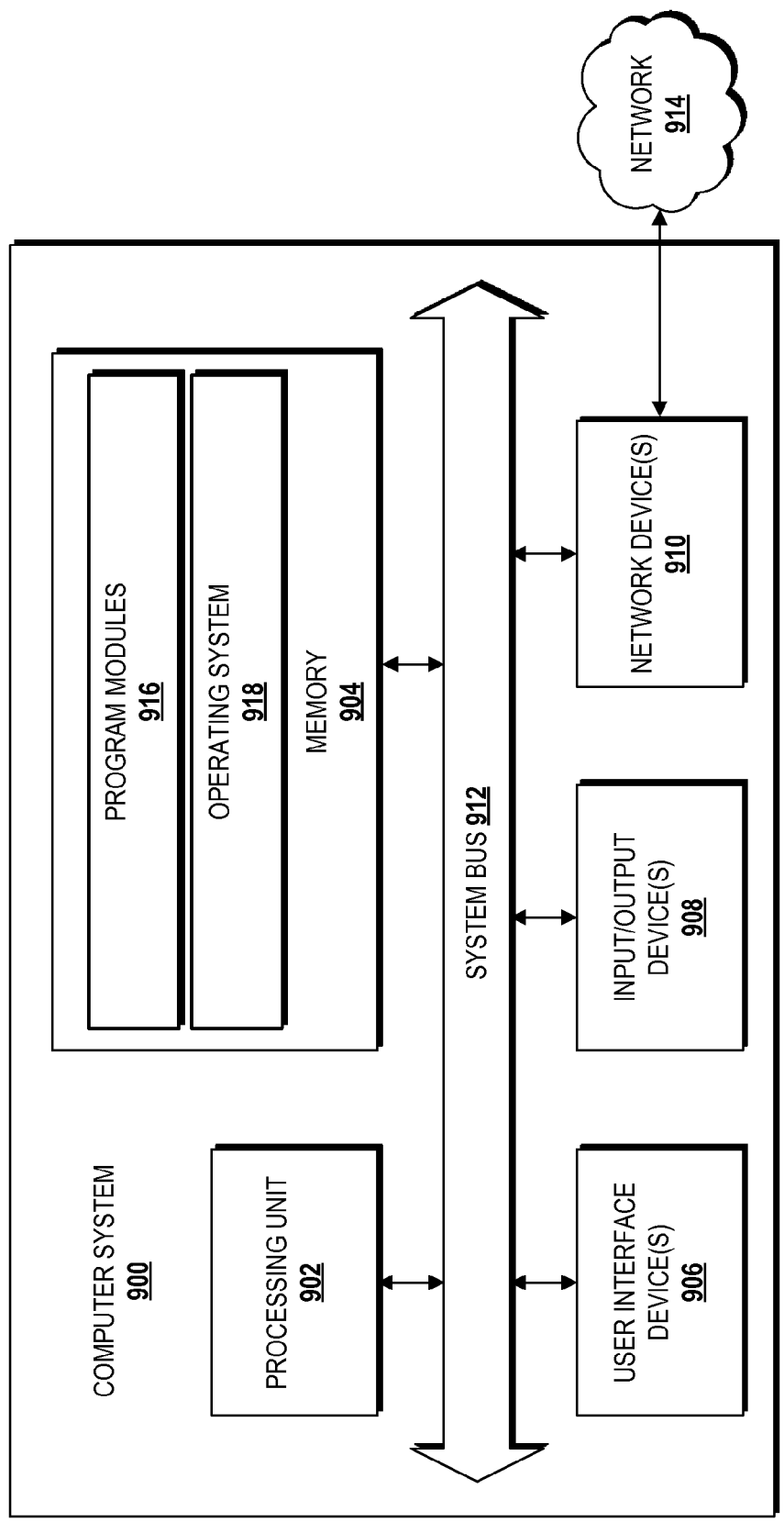
FIG. 9 is a block diagram illustrating an example computer system capable of implementing aspects of the embodiments presented herein.

FIG. 9 is a block diagram illustrating a computer system 900 configured to provide the functionality in accordance with various embodiments of the concepts and technologies disclosed herein. In some implementations, the user device 104 is configured to utilize an architecture that is the same as or similar to the architecture of the computer system 900. It should be understood, however, that modification to the architecture may be made to facilitate certain interactions among elements described herein.

The computer system 900 includes a processing unit 902, a memory 904, one or more user interface devices 906, one or more input/output ("I/O") devices 906, and one or more network devices 910, each of which is operatively connected to a system bus 912. The bus 912 enables bi-directional communication between the processing unit 902, the memory 904, the user interface devices 906, the I/O devices 908, and the network devices 910.

The processing unit 902 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 904 communicates with the processing unit 902 via the system bus 912. In some embodiments, the memory 904 is operatively connected to a memory controller (not shown) that enables communication with the processing unit 902 via the system bus 912. The memory 904 includes an operating system 918 (e.g., the operating system(s) 116) and one or more program modules 916 (e.g., the action determination module 112 and the application(s) 114). The operating system 918 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 916 may include various software and/or program modules to perform the various operations described herein. The program modules 916 and/or other programs can be embodied in computer-readable media containing instructions that, when executed by the processing unit 902, perform one or more of the operations described herein. According to embodiments, the program modules 916 may be embodied in hardware, software, firmware, or any combination thereof. The memory 904 can also store other data, if desired.

By way of example, and not limitation, computer-readable media may include any available computer storage media or communication media that can be accessed by the computer system 900. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 900. In the claims, the phrase "computer storage medium" and variations thereof does not include waves or signals per se and/or communication media.

The user interface devices 906 may include one or more devices with which a user accesses the computer system 900. The user interface devices 906 may include, but are not limited to, computers, servers, personal digital assistants, cellular phones, or any suitable computing devices. The I/O devices 908 enable a user to interface with the program modules 916. In one embodiment, the I/O devices 908 are operatively connected to an I/O controller (not shown) that enables communication with the processing unit 902 via the system bus 912. The I/O devices 908 may include one or more input devices, such as, but not limited to, a keyboard, a mouse, or an electronic stylus. Further, the I/O devices 908 may include one or more output devices, such as, but not limited to, a display screen or a printer.

The network devices 910 enable the computer system 900 to communicate with other networks or remote systems via a network 914, such as the network 118. Examples of the network devices 910 include, but are not limited to, a modem, a radio frequency ("RF") or IR transceiver, a telephonic interface, a bridge, a router, or a network card. The network 914 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 914 may be a wired network such as, but not limited to, a Wide Area Network ("WAN"), a wired LAN such as provided via Ethernet, a wired Personal Area Network ("PAN"), or a wired Metropolitan Area Network ("MAN").

Figure 10:
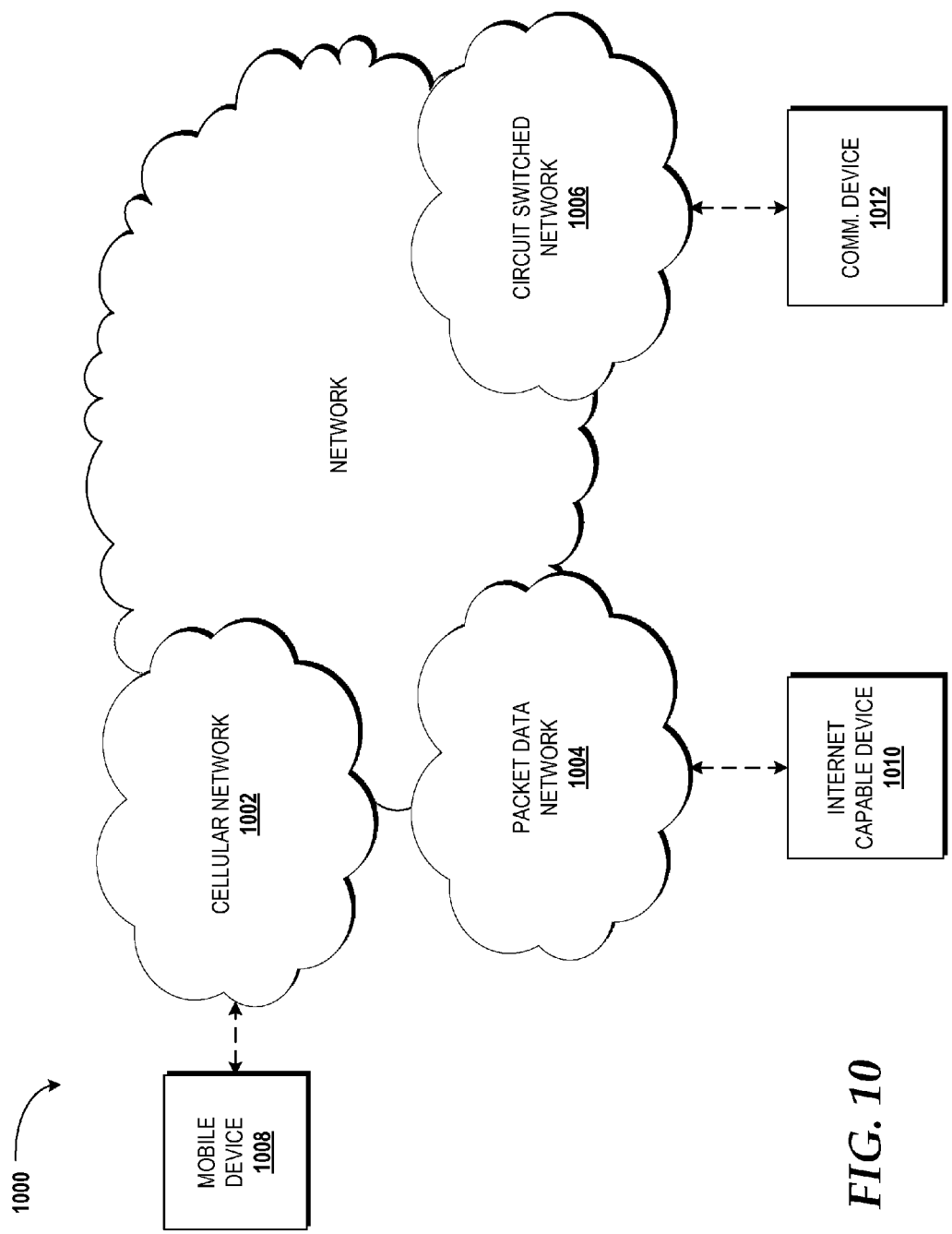
FIG. 10 schematically illustrates a network, according to an illustrative embodiment.

Turning now to FIG. 10, details of a network 1000 will be described, according to an illustrative embodiment. The network 1000 includes a cellular network 1002, a packet data network 1004, for example, the Internet, and a circuit switched network 1006, for example, a publicly switched telephone network ("PSTN"). The cellular network 1002 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1002 also includes radios and nodes for receiving and transmitting voice, data, and combinations thereof to and from radio transceivers, networks, the packet data network 1004, and the circuit switched network 1006.

A mobile communications device 1008, such as, for example, a cellular telephone, a user equipment, a mobile terminal, a PDA, a laptop computer, a handheld computer, the user device 104, and combinations thereof, can be operatively connected to the cellular network 1002. The cellular network 1002 can be configured as a 2G GSM network and can provide data communications via GPRS and/or EDGE. Additionally, or alternatively, the cellular network 1002 can be configured as a 3G UMTS network and can provide data communications via the HSPA protocol family, for example, HSDPA, EUL (also referred to as HSUPA), and HSPA+. The cellular network 1002 also is compatible with 4G mobile communications standards such as LTE, or the like, as well as evolved and future mobile standards.

The packet data network 1004 includes various devices, for example, servers, computers, databases, and other devices in communication with one another, as is generally known. The packet data network 1004 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1004 includes or is in communication with the Internet. The circuit switched network 1006 includes various hardware and software for providing circuit switched communications. The circuit switched network 1006 may include, or may be, what is often referred to as a plain old telephone system ("POTS"). The functionality of a circuit switched network 1006 or other circuit-switched network are generally known and will not be described herein in detail.

The illustrated cellular network 1002 is shown in communication with the packet data network 1004 and a circuit switched network 1006, though it should be appreciated that this is not necessarily the case. One or more Internet-capable devices 1010, for example, the user device 104, a PC, a laptop, a portable device, or another suitable device, can communicate with one or more cellular networks 1002, and devices connected thereto, through the packet data network 1004. It also should be appreciated that the Internet-capable device 1010 can communicate with the packet data network 1004 through the circuit switched network 1006, the cellular network 1002, and/or via other networks (not illustrated).

As illustrated, a communications device 1012, for example, a telephone, facsimile machine, modem, computer, the user device 104, or the like, can be in communication with the circuit switched network 1006, and therethrough to the packet data network 1004 and/or the cellular network 1002. It should be appreciated that the communications device 1012 can be an Internet-capable device, and can be substantially similar to the Internet-capable device 1010.

Based on the foregoing, it should be appreciated that concepts and technologies directed to predictive determination of actions have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A computer storage medium that stores a plurality of applications and computer-readable instructions that, when executed by a processor of a user device comprising a display, cause the processor to perform operations comprising:

receiving application settings for each of the plurality of applications to register the plurality of applications, wherein the application settings comprise at least one respective data type that can be utilized by a respective one of the plurality of applications, wherein each respective one of the plurality of applications is associated with at least one respective action option, and wherein each of the plurality of applications is executable by the processor;

receiving an input via a user input interface displayed on the display of the user device, wherein the user input interface is application agnostic;

identifying data associated with the input;

receiving a plurality of weights from the plurality of applications, wherein each weight of the plurality of weights is associated with a likelihood that a corresponding application of the plurality of applications can utilize the data associated with the input;

prioritizing, based upon the likelihood that the corresponding application of the plurality of applications can utilize the data associated with the input, each of the plurality of applications for arranging the at least one respective action option associated with each of the plurality of applications based upon the prioritizing;

determining a weight of the plurality of weights that is associated with a highest likelihood that the corresponding application of the plurality of applications can utilize the data associated with the input; and presenting, on the display, the at least one respective action option associated with the corresponding application associated with the weight that is associated with the highest likelihood that the corresponding application of the plurality of applications can utilize the data associated with the input for selection in response to the input, wherein the at least one respective action option associated with the corresponding application associated with the weight that is associated with the highest likelihood comprises an action to be performed by the corresponding application when the at least one respective action option is selected.

2. The computer storage medium of claim 1, wherein the operations further comprise launching the user input interface in response to a user trigger.

3. The computer storage medium of claim 1, wherein the operations further comprise:

receiving a selection of the at least one respective action option; and in response to receiving the selection of the at least one respective action option, performing the action.

4. The computer storage medium of claim 1, wherein the operations further comprise:

receiving a further input via the user input interface; and analyzing the further input to determine a further action option, the further action option comprising a further action to be performed by the user device if selected.

5. computer storage medium of claim 1, wherein the operations further comprise:

receiving a further input via the user input interface; and analyzing the further input to modify the at least one respective action option.

6. The computer storage medium of claim 4, wherein the input comprises numbers and the further input comprises text, wherein the at least one respective action option comprises a send short messaging service message option that, when selected, causes the user device to perform the action, the action comprising the user device generating a short messaging service message directed to a telephone number defined by the numbers and having a message body that contains the text and the user device opening a short messaging service application through which the message body can be modified prior to the short messaging service message being sent, and the further action option comprises a send short messaging service message option as-is that, when selected, causes the user device to perform the further action, the further action comprising the user device generating a short messaging service message directed to a telephone number defined by the numbers and having a message body that contains the text and the user device sending the short messaging service message.

7. The computer storage medium of claim 1, wherein the input comprises numbers, and wherein the at least one respective action option comprises a call action option, a send short messaging service message option, or a call action option and a send short messaging service message option.

8. A user device comprising:

a display;

a processor; and a memory that stores a plurality of applications and instructions that, when executed by the processor, cause the processor to perform operations comprising:

receiving application settings for each of the plurality of applications to register the plurality of applications, wherein the application settings comprise at least one respective data type that can be utilized by a respective one of the plurality of applications, wherein each respective one of the plurality of applications is associated with at least one respective action option, and wherein each of the plurality of applications is executable by the processor, receiving an input via a user input interface displayed on the display of the user device, wherein the user input interface is application agnostic, identifying data associated with the input, receiving a plurality of weights from the plurality of applications, wherein each weight of the plurality of weights is associated with a likelihood that a corresponding application of the plurality of applications can utilize the data associated with the input, prioritizing, based upon the likelihood that the corresponding application of the plurality of applications can utilize the data associated with the input, each of the plurality of applications for arranging the at least one respective action option associated with each of the plurality of applications based upon the prioritizing, determining a weight of the plurality of weights that is associated with a highest likelihood that the corresponding application of the plurality of applications can utilize the data associated with the input, and presenting, on the display, the at least one respective action option associated with the corresponding application associated with the weight that is associated with the highest likelihood that the corresponding application of the plurality of applications can utilize the data associated with the input for selection in response to the input, wherein the at least one respective action option associated with the corresponding application associated with the weight that is associated with the highest likelihood comprises an action to be performed by the corresponding application when the at least one respective action option is selected.

9. The user device of claim 8, wherein presenting the user input interface on the display comprises presenting the user input interface on the display in response to a user trigger.

10. The user device of claim 8, wherein the operations further comprise:
receiving a selection of the at least one respective action option; and
in response to receiving the selection of the at least one respective action option, performing the action.

11. The user device of claim 8, wherein the operations further comprise:
receiving a further input via the user input interface; and
analyzing the further input to determine a further action option, the further action option comprising a further action to be performed by the user device if selected.

12. The user device of claim 11, wherein the input comprises numbers and the further input comprises text, wherein the at least one respective action option comprises a send short messaging service message option that, when selected, causes the user device to perform the action, the action comprising the user device generating a short messaging service message directed to a telephone number defined by the numbers and having a message body that contains the text and the user device opening a short messaging service application through which the message body can be modified prior to the short messaging service message being sent, and the further action option comprises a send short messaging service message option as-is that, when selected, causes the user device to perform the further action, the further action comprising the user device generating a short messaging service message directed to a telephone number defined by the numbers and having a message body that contains the text and the user device sending the short messaging service message.

13. The user device of claim 8, wherein the operations further comprise:
receiving a further input via the user input interface; and
analyzing the further input to modify the at least one respective action option.

14. The user device of claim 8, wherein the input comprises numbers, and wherein the at least one respective action option comprises a call action option, a send short messaging service message option, or a call action option and a send short messaging service message option.

15. A method comprising:
receiving, by a processor of a user device comprising a display and a memory storing a plurality of applications executable by the processor, application settings for each of the plurality of applications to register the plurality of applications, wherein the application settings comprise at least one respective data type that can be utilized by a respective one of the plurality of applications, wherein each respective one of the plurality of applications is associated with at least one respective action option, and wherein each of the plurality of applications is executable by the processor;
receiving, by the processor, input via a user input interface displayed on the display of the user device, wherein the user input interface is application agnostic;
identifying, by the processor, data associated with the input;
receiving, by the processor, a plurality of weights from the plurality of applications, wherein each weight of the plurality of weights is associated with a likelihood that a corresponding application of the plurality of applications can utilize the data associated with the input;
prioritizing, by the processor, based upon the likelihood that the corresponding application of the plurality of applications can utilize the data associated with the input, each of the plurality of applications for arranging the at least one respective action option associated with each of the plurality of applications based upon the prioritizing;
determining, by the processor, a weight of the plurality of weights that is associated with a highest likelihood that the corresponding application of the plurality of applications can utilize the data associated with the input; and
presenting, by the processor, on the display, the at least one respective action option associated with the corresponding application associated with the weight that is associated with the highest likelihood that the corresponding application of the plurality of applications can utilize the data associated with the input for selection in response to the input, wherein the at least one respective action option associated with the corresponding application associated with the weight that is associated with the highest likelihood comprises an action to be performed by the corresponding application when the at least one respective action option is selected.

16. The method of claim 15, further comprising launching the user input interface in response to a user trigger.

17. The method of claim 15, further comprising:
receiving a selection of the at least one respective action option; and
in response to receiving the selection of the at least one respective action option, performing the action.

18. The method of claim 15, further comprising:
receiving a further input via the user input interface; and
analyzing the further input to determine a further action option, the further action option comprising a further action to be performed by the user device if selected.

19. The method of claim 15, further comprising:
receiving a further input via the user input interface; and
analyzing the further input to modify the at least one respective action option.

* * * * *